(12) United States Patent
Bloink et al.

(10) Patent No.: US 11,014,404 B2
(45) Date of Patent: May 25, 2021

(54) FABRICATED AXLE WITH REMOVABLE KING PIN

(71) Applicant: Hendrickson USA, L.L.C., Itasca, IL (US)

(72) Inventors: Michael P. Bloink, Romeoville, IL (US); Damon E. Dilworth, Channahon, IL (US); Paul D. Elwood, Plainfield, IL (US); Jonathan W. Goding, Joliet, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 555 days.

(21) Appl. No.: 15/578,166

(22) PCT Filed: May 27, 2016

(86) PCT No.: PCT/US2016/034838
§ 371 (c)(1),
(2) Date: Nov. 29, 2017

(87) PCT Pub. No.: WO2016/196375
PCT Pub. Date: Dec. 8, 2016

(65) Prior Publication Data
US 2018/0141377 A1 May 24, 2018

Related U.S. Application Data

(60) Provisional application No. 62/168,576, filed on May 29, 2015.

(51) Int. Cl.
*B62D 7/18* (2006.01)
*B60B 35/08* (2006.01)
(Continued)

(52) U.S. Cl.
CPC ............ *B60B 35/08* (2013.01); *B60B 35/003* (2013.01); *B60B 35/06* (2013.01); *B62D 7/18* (2013.01); *B60G 2204/4306* (2013.01)

(58) Field of Classification Search
CPC ....... B60B 35/08; B60B 35/003; B60B 35/06; B60B 2360/1458; B62D 7/18
See application file for complete search history.

(56) References Cited

U.S. PATENT DOCUMENTS

| 1,982,890 A | 12/1934 | Urschel |
| 3,915,469 A * | 10/1975 | Vanice ............... B62D 7/18 |
| | | 280/93.512 |

(Continued)

FOREIGN PATENT DOCUMENTS

| CN | 104 129 230 A | 11/2014 |
| DE | 722718 C | 7/1942 |

OTHER PUBLICATIONS

International Search Report dated Sep. 16, 2016 for International Application No. PCT/US2016/034838.
(Continued)

*Primary Examiner* — Scott A Browne
(74) *Attorney, Agent, or Firm* — Cook Alex Ltd.

(57) ABSTRACT

Fabricated axles with a removable king pin are disclosed. The fabricated axles incorporate U-shaped channel construction. Extensions of front and rear channel walls wrap partially around and separately join axle head plates which support a removable king pin. King pin fastener bores are partially defined by the head plate and by front and rear channel walls. The bottom surface of the head plate is received within an opening of, and secured to, the bottom plate which overlays the channel.

21 Claims, 28 Drawing Sheets

(51) Int. Cl.
    *B60B 35/06*     (2006.01)
    *B60B 35/00*     (2006.01)

(56) References Cited

U.S. PATENT DOCUMENTS

| | | | |
|---|---|---|---|
| 4,192,396 A * | 3/1980 | Austermann, Jr. | B60B 35/08 180/252 |
| 5,810,377 A * | 9/1998 | Keeler | B60G 9/00 180/905 |
| 7,665,746 B2 * | 2/2010 | Platner | B62D 7/18 280/93.512 |
| 2011/0101771 A1 | 5/2011 | De Freitas Junior | |
| 2012/0056469 A1 * | 3/2012 | Bubulka | B60B 35/003 301/127 |
| 2012/0146396 A1 * | 6/2012 | Bubulka | B60B 35/06 301/124.1 |

OTHER PUBLICATIONS

Written Opinion dated Sep. 16, 2016 of the European Patent Office International Searching Authority for International Application No. PCT/US2016/034838.

\* cited by examiner

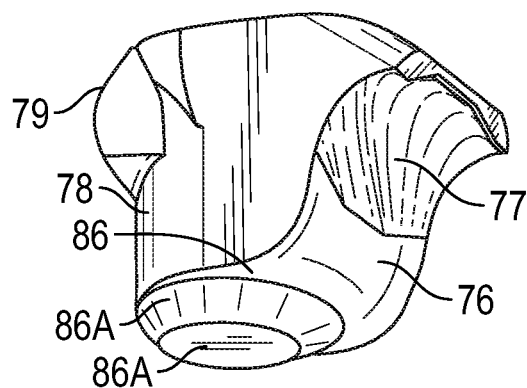
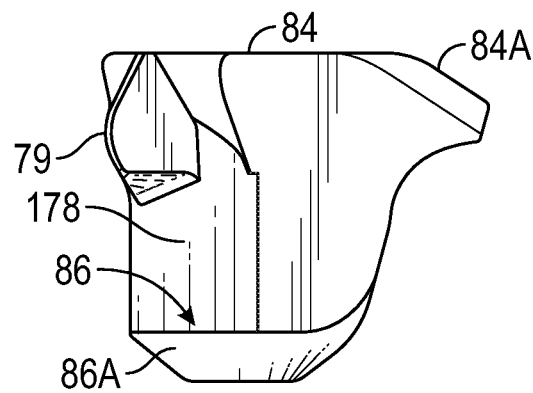
FIG. 13     FIG. 14
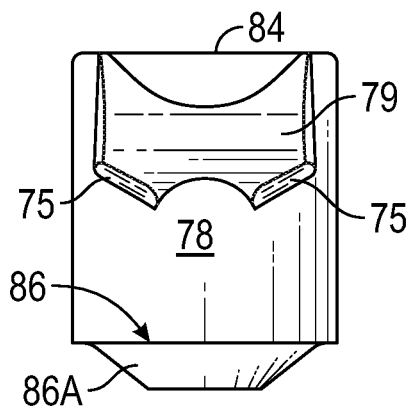
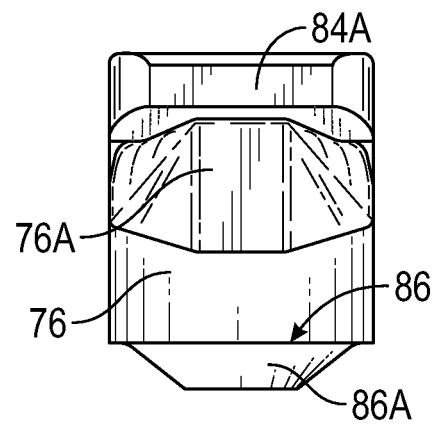
FIG. 15     FIG. 16
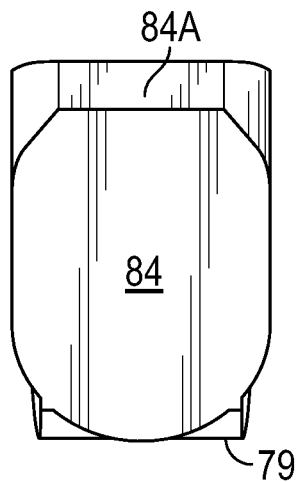
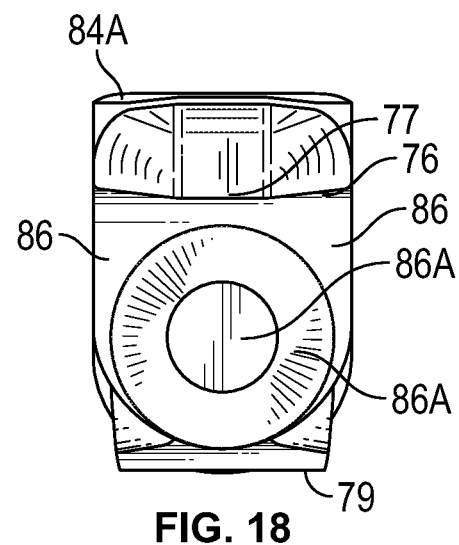
FIG. 17     FIG. 18

FABRICATED AXLE WITH REMOVABLE KING PIN

CROSS-REFERENCE TO RELATED APPLICATIONS

This patent application is a U.S. national phase application of PCT International Application No. PCT/US2016/034838, filed May 27, 2016, which claims prior to and the benefit of U.S. Provisional Application Ser. No. 62/168,576, filed May 29, 2015, all of which are incorporated herein by reference in their entireties.

BACKGROUND

Field of the Disclosure

The present subject matter relates generally to axles for vehicles and more particularly to fabricated axles for vehicles and processes for making same.

Typical steer axle assemblies for vehicles include a forged I-beam axle, and a pair of steering knuckles pivotally attached to opposite ends of the axle by way of king pins. Although they are generally strong and reliable, such forged I-beam axles are limited in their shape, are relatively heavy, and require a relatively large amount of machining. All of this translates into increased manufacturing and payload costs.

In view of the foregoing, fabricated axles have been developed. Such axles are typically manufactured from sheets of steel that are cut and then welded together. Fabricated axles generally weigh less than forged I-beam axles. For at least one known application, a forged I-beam steering axle for use with heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axles is that the material used (e.g., steel) can be spread around for more efficient distribution thereof. This can contribute to making the fabricated axle much lighter, and can even make it stiffer against both bending and torsion stresses. On top of all this, fabricated axles typically require less machining than forged I-beam axles. Accordingly, they are easier and less expensive to manufacture.

Examples of known fabricated axles and axle head plates are shown and described in U.S. Pat. Nos. 7,862,058; 8,544,961; and 8,616,566, the entirety of which incorporated herein by reference.

Possible challenges are presented, however, in maintaining and/or improving on efficiencies in design, manufacture and serviceability of fabricated vehicle axles for larger and heavier payloads and weight classes.

Accordingly, it is desirable to overcome one or more of the challenges with, or shortcomings of, prior fabricated axle designs.

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, a vehicle axle comprises a main beam formed by a channel and a bottom plate secured to the channel. The main beam forms at one end a first axle head section and at an opposing end a second axle head section. The main beam extends between the first axle head section and the second axle head section.

The channel has an inverted U-shaped configuration defining a channel front wall, and a channel rear wall and a channel top wall. A first extension extends from the front wall of the channel and is positioned at the first axle head section. A second extension extends from the rear wall of the channel and is positioned at the second axle head section. Each of the first and second extensions has a proximal end and a distal end.

The axle also includes a first head plate having a top surface, a bottom surface and a sidewall that extends therebetween. The sidewall has inboard, outboard, front and rear surfaces. The first head plate is positioned at the first axle head section. The first and second extensions form respectively, the front and rear walls of the channel, wrap partially around and are separately joined to the sidewall of the first head plate. The distal ends of the first and second extensions are spaced apart.

In a second aspect of this disclosure, a vehicle axle comprises a main beam formed by a channel and a bottom plate secured to the channel. The main beam forms at one end, a first axle head section, at an opposing end, a second axle section. The main beam and the channel extend between the first axle head section and the second axle head section. The channel has an inverted U-shaped configuration defining a front wall, a rear wall and a top wall.

The axle also includes a first head plate having a top surface, a bottom surface and a sidewall extending therebetween. The sidewall has inboard, outboard, front and rear surfaces. The first head plate is secured to the channel at the first axle head section and has a first king pin bore that extends in a generally vertical direction between the bottom surface and the top surface of the head plate. The first head plate also has a portion of a first fastener bore that extends in a generally horizontal direction, partially intersects the first king pin bore and is configured to receive a first fastener to assist in removably securing a king pin. The first fastener bore is partially defined by the first head plate and by a portion of the front and/or rear wall of the channel.

In a third aspect of this disclosure, a vehicle axle comprises a main beam formed by a channel and a bottom plate secured to the channel. The main beam forms at one end, a first axle head section, and at an opposing end, a second axle head section.

The axle includes a first head plate having a top surface, a bottom surface and a sidewall extending therebetween. The first head plate is positioned at the first axle head section and has a generally vertically oriented king pin bore extending between the bottom surface and the top surface of the head plate.

The bottom plate has an opening and is joined to the first head plate. At least a portion of the bottom surface of the head plate is received by the opening in the bottom plate.

BRIEF DESCRIPTION OF THE DRAWINGS

In describing the preferred examples, reference is made to the accompanying drawing figures wherein like parts have like reference numerals, and wherein:

FIG. 13 is a perspective view of a head plate requiring further processing for a vehicle axle according to an aspect of the present disclosure;

FIG. 14 is an elevational view of the head plate of FIG. 13;

FIG. 15 is an outboard side, elevational view of the head plate of FIG. 13;

FIG. 16 is an inboard side, elevational view of the head plate of FIG. 13;

FIG. 17 is a top plan view of the head plate of FIG. 13;

FIG. 18 is a bottom plan view of the head plate of FIG. 13;

FIG. 47D is an elevational view of the material shown in FIG. 47C after undergoing further processing;

DETAILED DESCRIPTION

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

As used herein, terms of direction (e.g., front, rear, outboard, inboard, vertical, horizontal, lateral, and longitudinal) are to be understood with reference to the orientation of the axle (or individual components or portions thereof) when associated with a motorized vehicle, per conventional design.

Figure 1:
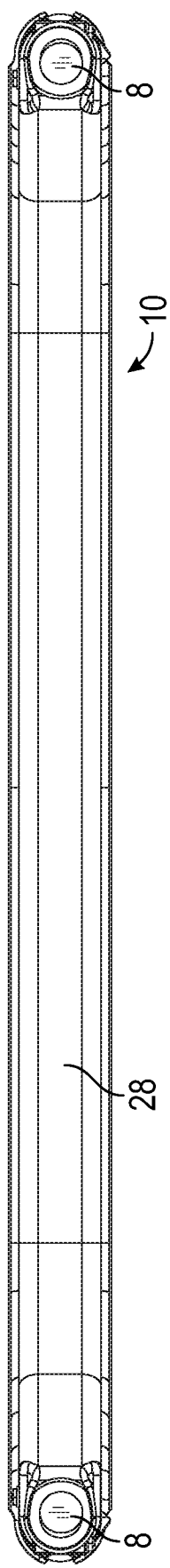
FIG. 1 a top plan view of a vehicle axle according to an aspect of the present disclosure.
Figure 2:
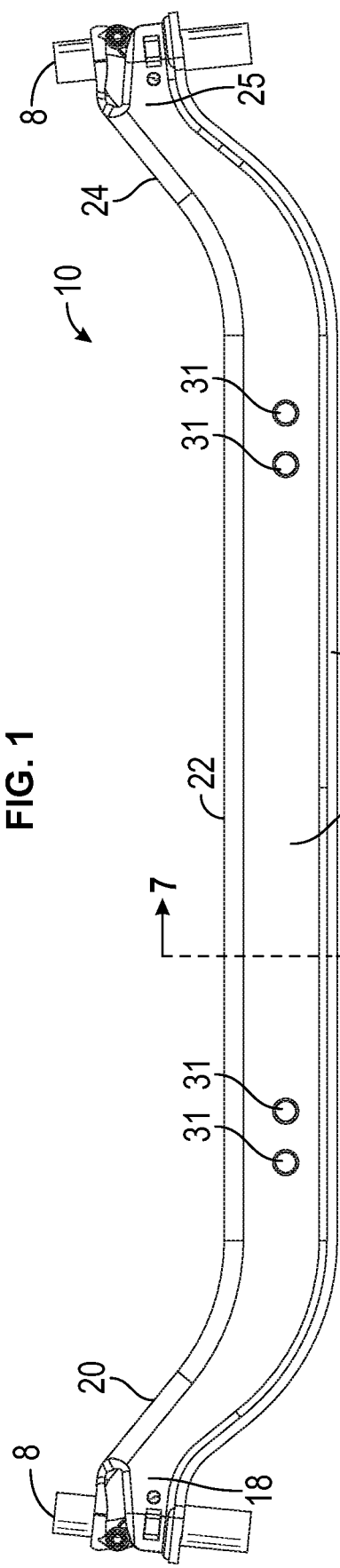
FIG. 2 is a rear elevational view of the vehicle axle of FIG. 1.
Figure 3:
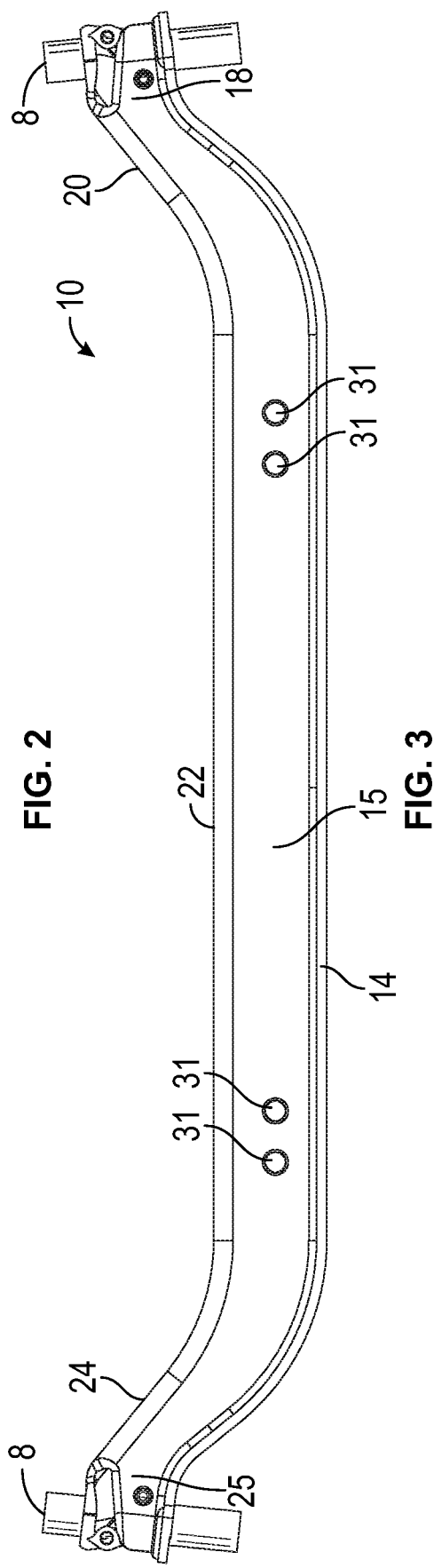
FIG. 3 is a front elevational view of the vehicle axle of FIG. 1

FIGS. 1-3 illustrate a fabricated vehicle axle generally designated 10. Axle 10 includes a channel 12 and a bottom plate 14 together forming a main body 15. Axle 10 also has first and second end (head) sections 18, 25 at each end thereof. A head plate 16, further described and illustrated herein, is positioned at each head section 18, 25 of axle 10. Channel 12, bottom plate 14 and the head plates 16 are secured together, for example by welding operations, along their respective points and lines of intersection. Channel 12 and bottom plate 14 may be made from a variety of suitable materials, such as 100KSI sheet steel or other suitable high-strength low alloy ("HSLA") steel.

Figure 4:
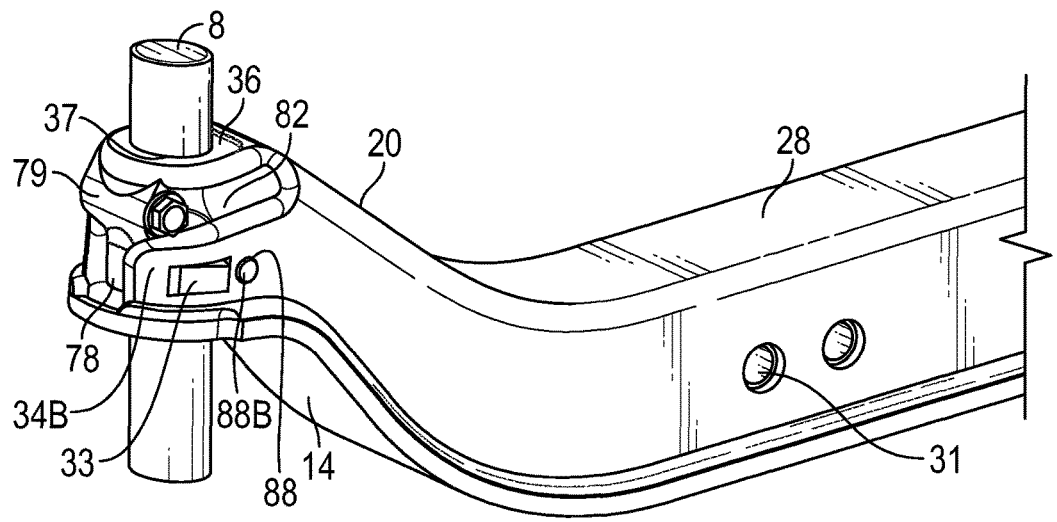
FIG. 4 is a rear, upper perspective view of the left side of the embodiment shown in FIGS. 1-3.
Figure 5:
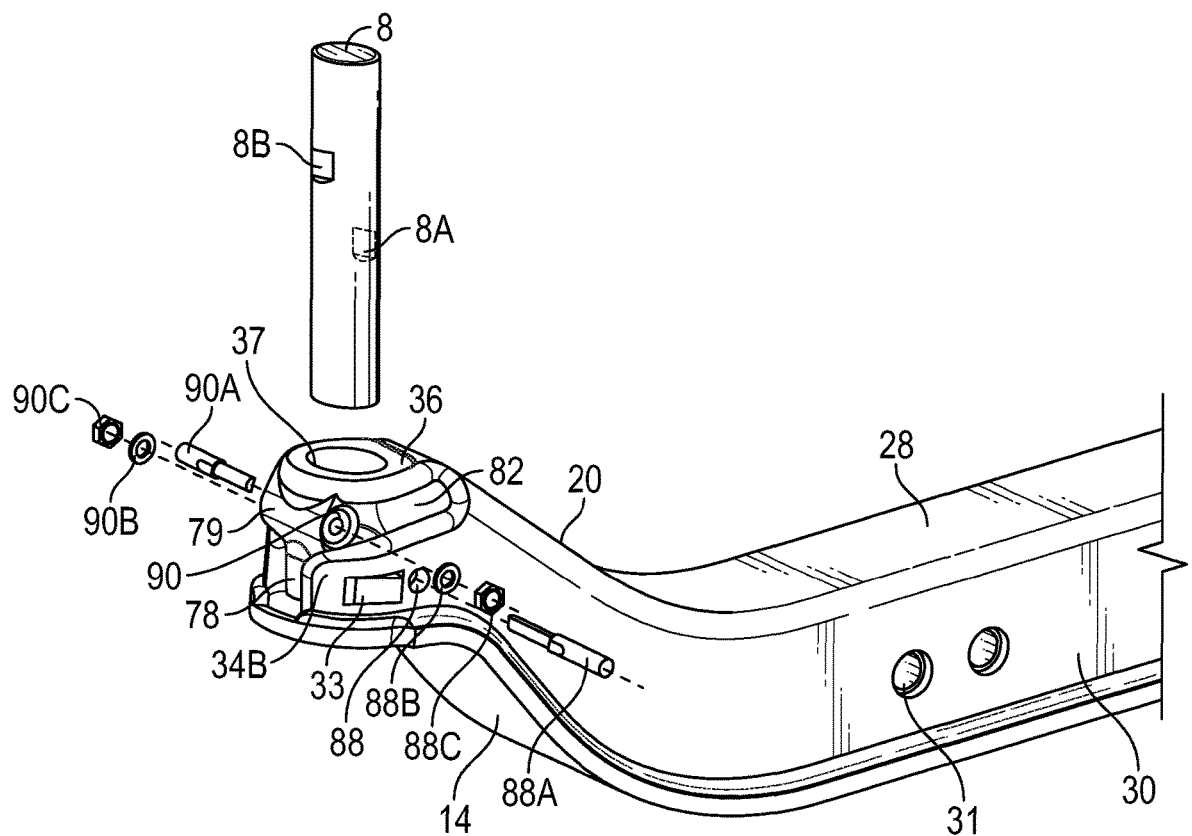
FIG. 5 is a partially exploded, rear, upper perspective view of the left side of the embodiment shown in FIGS. 1-3.

Axle main body 15 has a first gooseneck section 20, a midsection 22, and a second gooseneck section 24 (FIG. 2). FIGS. 4-5 illustrates the first head section 18 of axle 10 and the first gooseneck section 20 and part of midsection 22 of main body 15.

Also illustrated in FIGS. 4-5 is a king pin 8 in its desired position to permit mounting of a steering knuckle (not shown). King pins 8 are also illustrated in FIGS. 2-3.

Figure 7:
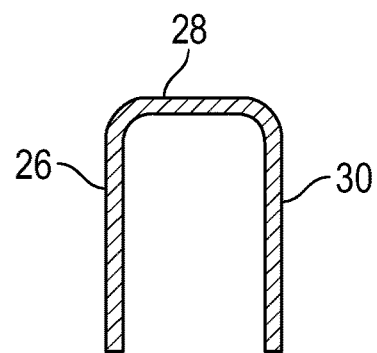
FIG. 7 is a portion of a cross-sectional view of the vehicle axle shown in FIG. 2, taken along lines 7-7 thereof.

FIG. 7 illustrates channel 12 as having an inverted U-shaped vertical cross-section at those portions thereof associated with the midsection 22 and the first and second gooseneck sections 20, 24 of main body 15. As shown, channel 12 includes a front wall 26, a top wall 28 and a rear wall 30. Front and rear walls 26,30 may include axle seat bolt holes 31 to permit mounting of an axle seat for suspension components (see also FIGS. 2-3). It will be noted that FIG. 7 does not show bottom plate 14.

As used herein, the term "U-shaped" is used broadly and is not limited to the illustrated configuration of channel 12 having a pair of downwardly extending front and rear walls 26, 30 that are generally perpendicular to a top wall 28. Other configurations within the scope of that term may include, for example, downwardly extending walls or legs that are inclined with respect to a top wall or curved to provide a generally C-shaped cross-section.

Figure 6A:
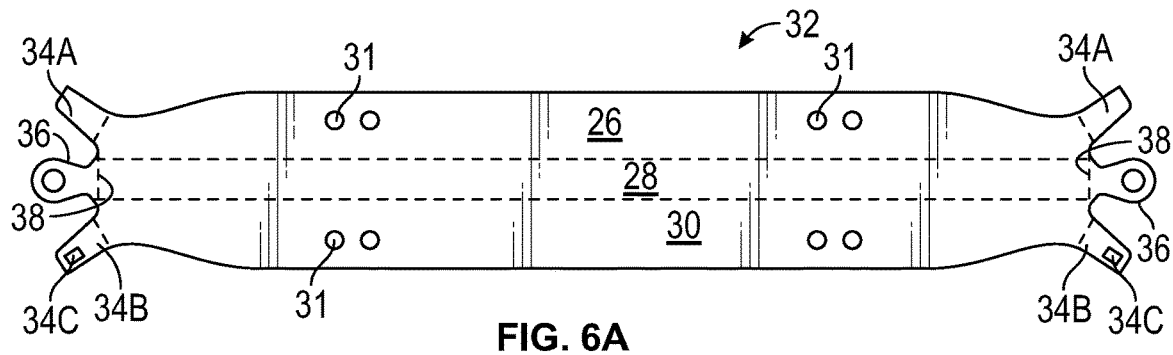
FIG. 6A is a plan view of material used to form the channel structure used to make the vehicle axle shown in FIGS. 1-3.

FIGS. 6A-6D illustrate four progressive steps for forming channel 12. It should be understood that the illustrated process is merely exemplary and that other manufacturing methods (including modifications to the described methods) may be practiced without departing from the scope of the present disclosure. FIG. 6A illustrates a first step wherein a flat 32 is cut or otherwise removed from a rectangular blank of material. As shown, flat 32 includes front wall 26, top wall 28 and rear wall 30. The flat 32 is shaped to include tab-like end extensions 34A, 34B extending from each lateral end (i.e., the left and right ends) of each of the front and rear walls 26, 30. Axle seat bolt holes 31 may be cut or formed in flat 32. Windows 34C may be cut or formed in end extensions 34B (which are associated with the rear wall 30) and may be configured to receive an insert or projection 33 that will serve as a steering stop to prevent rotation of the steering knuckle beyond a desired point. Steering stop insert or projection 33 may provide generally vertical surface and may be secured in window 34C to rear wall end extension 34B and/or the head plate by vertical weld seams along inboard and outboard edges of the projection. Front and rear wall end extensions 34A, 34B may be bent upward along bend lines 35A, 35B to the configuration of FIG. 6B.

Figure 6B:
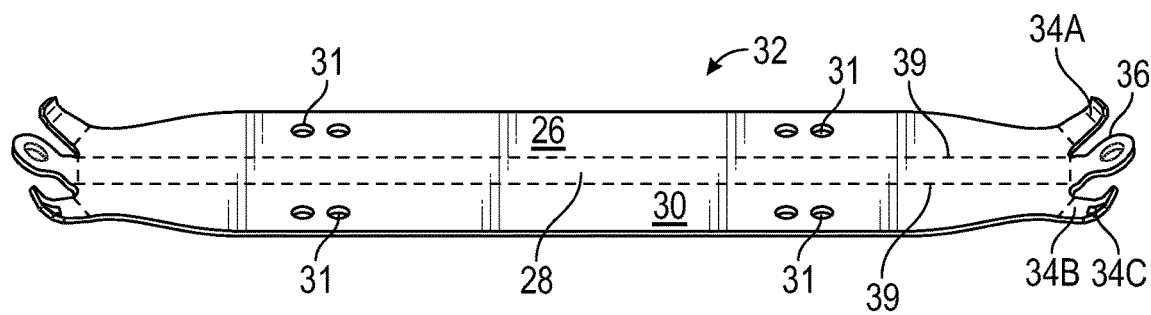
FIG. 6B is an a perspective view of the material shown in FIG. 6A after undergoing initial processing.

Flat 32 may also be shaped to include optional tab-like extensions 36 extending from each end of the top wall 28. As further described herein, tab-like extensions 36 correspond to axle head cover flaps for axle 10. Cover flap holes 37 may be formed in flat 32 within each tab-like extension 36, as shown in FIGS. 6A-6B. Tab-like extensions 36 may be bent upward along bend lines 38 to the configuration of FIG. 6B.

Flat 32 is preferably built into the rectangular blank of material, as described. This eliminates the need to trim the bottom edge of channel 12 once it is bent and formed to mate with bottom plate 14. Laser or machining this profile after bending would require costly equipment and take considerable time.

Figure 6C:
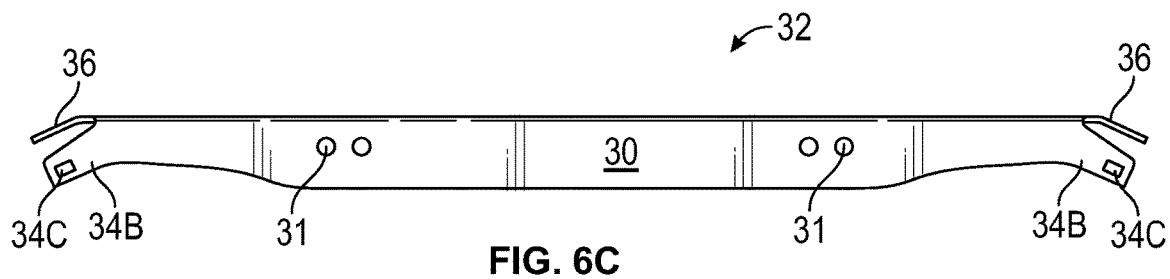
FIG. 6C is an elevational view of the material shown in FIG. 6B after undergoing further processing.

FIG. 6C illustrates a third step for forming channel 12 wherein flat 32 illustrated in FIG. 6B is bent along bend lines 39 illustrated therein. During this bending of flat 32, each end of channel 12 is partially closed off by end extensions 34A and 34B which are respectively the end extensions of front wall 26 and rear wall 30. Each end of channel 12 is also partially covered by extension 36 (if present) serving as a cover flap for the channel end.

Figure 6D:
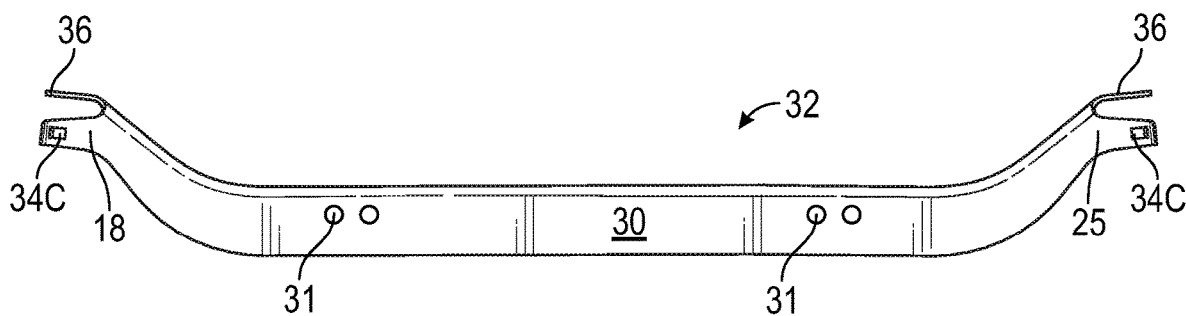
FIG. 6D is an elevational view of the material shown in FIG. 6C after undergoing further processing.

FIG. 6D illustrates a fourth step for forming channel 12 wherein the channel is further bent upwards at its end portions so that it assumes an inverted gull-wing type shape when viewed from the front or rear. In this step, channel 12 is formed to define the portions thereof associated with the upwardly and outwardly extending gooseneck sections 20, 24 of main body 15 and the primarily outwardly extending head sections 18, 25 of axle 10 (see also FIGS. 2 and 3). The portions of channel 12 associated with the gooseneck sections 20, 24 of main body 15 are substantially identical to each other and separated by a portion of the channel associated with the generally straight midsection 22 of the main body (see also FIGS. 2-3). This fourth step for forming channel 12 may be carried out by a number of beam-bending or rolling techniques, or other forming methods. Methods that may be used include: (1) stamping in a male/female die set contoured to the final shape, (2) using a press brake with side bolsters to inhibit side wall deformation, (3) fluid cell (bag) press, (4) roll forming, (5) stretch forming, and (6) hydroforming.

In an example method for forming channel 12 as illustrated in FIG. 6D, channel 12 is placed over a multi-piece mandrel so that the mandrel is inserted into the open end (bottom) of channel 12. The mandrel includes three pieces, with two of the pieces being relatively short end pieces (corresponding to the portions of channel 12 associated with gooseneck sections 20, 24 of main body 15) and the third being a longer central piece (corresponding to the portion of the channel associated with midsection 22 of the main body). The mandrel pieces are arranged end-to-end and generally prevent channel 12 from deforming inwardly during the forming process.

Each outer end of the end mandrel pieces is carried by a stationary support, with each inner end thereof being carried by an associated resilient support. Resilient supports also support the ends of the central mandrel piece. The resilient supports may be variously provided, such as deformable pads or hydraulic/air cylinders or the like. Resilient supports allow for pivoting of the end mandrel pieces (i.e., downward relative movement of the inner ends of the end mandrel pieces with respect to the outer ends thereof). A pivot mechanism is associated with each end mandrel piece to further facilitate such pivoting action. The pivoting action allows the end mandrel pieces to generally follow the shape of the portions of channel 12 associated with the gooseneck sections 20, 24 of main body 15 during the forming process.

A forming or radius die is provided above channel 12, the mandrel pieces, and supports. The forming die has an inverted U-shaped cross-section that defines a channel for receiving channel 12. The sides of this channel are defined by side bolsters that generally conform to the downwardly extending front and rear walls 26, 30 of channel 12 and prevent the walls from bowing outwardly in the bend-effected zones during the process, thereby preserving a substantially uniform width along channel 12. The top portion of this channel is pressed into contact with top wall 28 of channel 12 by a punch and is shaped like the final curvature of channel 12. Due to material springback, the actual curvature of the gooseneck portions typically has a slightly greater radius of curvature than that of the punch, which may be considered when designing the tooling.

In use, the mandrel pieces are placed on the supports and channel 12 is positioned on the mandrel pieces. The forming die is then moved downwardly to contact channel 12. The contoured top portion of the forming die channel forces the center portion of channel 12 downwardly as the resilient supports move downwardly to allow for such movement. The stationary supports maintain the end portions of channel 12 at a higher elevation, thereby forcing the channel to bend in the areas between the stationary supports and the adjacent resilient support. The end mandrel pieces pivot about the associated pivot mechanism to allow for this bending of channel 12. The presence of the mandrel and the side bolsters prevents the bent portions of channel 12 from deforming inwardly or outwardly, thereby maintaining the U-shaped cross-section of the channel at the bent portions thereof associated with gooseneck portions 20, 24 of main body 15 during and after forming. In this method, the entire channel 12 is formed in a single (one hit) operation.

In another example method for forming channel 12 as illustrated in FIG. 6D, each end portion of the channel is formed separately. This method requires two operations (or hits), one for each end portion of channel 12. Because each end portion of the channel is formed independently, each end portion may be adjusted as desired.

Figure 8:
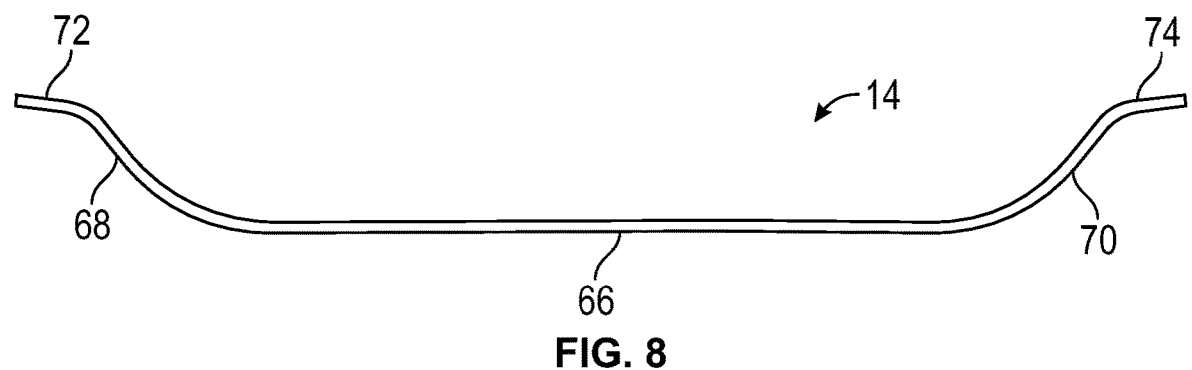
FIG. 8 is an edge view of the bottom plate structure used in the vehicle axle shown in FIGS. 1-3.

FIG. 8 illustrates the bottom plate 14 of the fabricated axle 10. The bottom plate 14 is provided as a rectangular strip of material that is formed (e.g., by bending) to provide a substantially flat body portion 66 associated with the midsection 22 of main body 15, upwardly and outwardly extending gooseneck portions 68, 70 (FIG. 8) associated with the first and second gooseneck sections 20, 24 (FIG. 3) of the main body, and primarily outwardly extending head portions 72, 74 (FIG. 8) associated with the first and second end sections 18, 25 (FIG. 3) of the axle 10. Bottom plate 14 generally matches the contour of channel 12. Bottom plate 14 is preferably slightly wider than channel 12 to provide a convenient welding surface. Large bend radii on bottom plate 14 eliminate stress concentrations and improve the durability of the welds joining channel 12 to the bottom plate.

Figure 9:
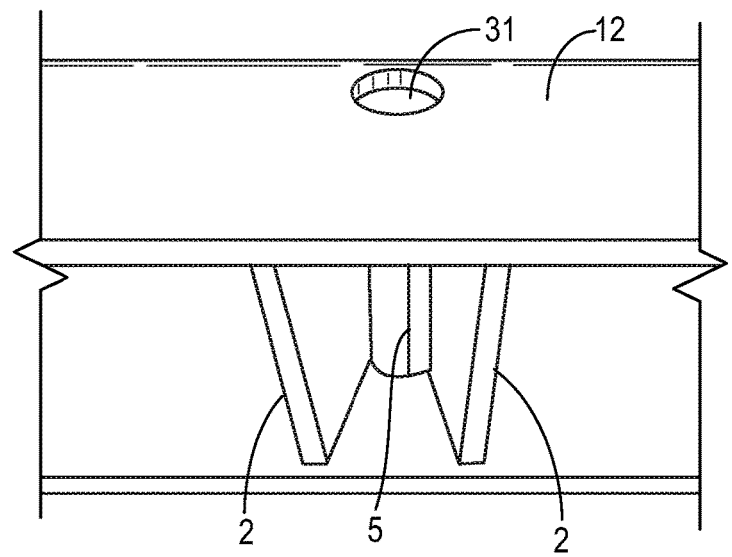
FIG. 9 is a bottom perspective view of a torsion resistor installed within a vehicle axle according to an aspect of the present disclosure.
Figure 10:
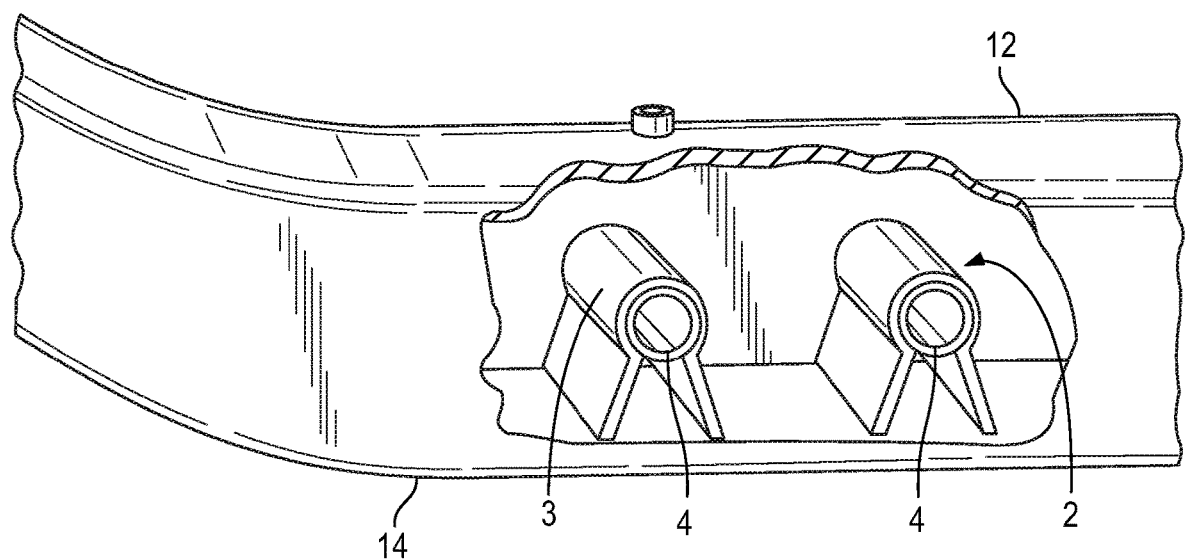
FIG. 10 is a perspective view of a vehicle axle, with a section thereof broken away to show torsion resistors installed within the vehicle axle.

FIGS. 9 and 10 illustrate the U-shaped channel 12 with axle seat bolt holes 31. A torsion resistor 2 is installed within channel 12. Torsion resistor has a keyhole-like shape, and includes an axially extending rounded surface defining an arc in cross-section. The arc preferably extends beyond a semicircle (i.e, having an arc angle greater than one hundred eighty degrees), as shown. Torsion resistor also includes wings 6 forming surfaces extending approximately radially outwardly from the opposite ends of this arc. A metal retaining sleeve 4 is axially inserted, preferably by press fit, within the rounded surface 3 of torsion resister 2. In lieu of the single piece design of retaining sleeve 4, two separate shorter axial metal retaining sleeves can be used, one at each end of torsion resistor 2. Retaining sleeve 4 includes an axially extending gap 5 permitting tolerance flexibility. Retaining sleeve 4 will spring radially outwardly to press against the inner diameter of the torsion resistor rounded surface 3. Retaining sleeve 4 functions to hold torsion resistor 2 in place.

Torsion resistors 2 are preferably clamped in place by clamp assembly bolts (not shown) during the assembly process. Following the assembly process, the clamp assembly bolts are removed and then the axle seat (not shown) may be mounted on the axle. Torsion resistors 2 stiffen the axle beam and react against torsional loads. Additional weld passes also aid in preventing cracking between channel 12 and bottom plate 14 in the noted areas.

Figure 11:
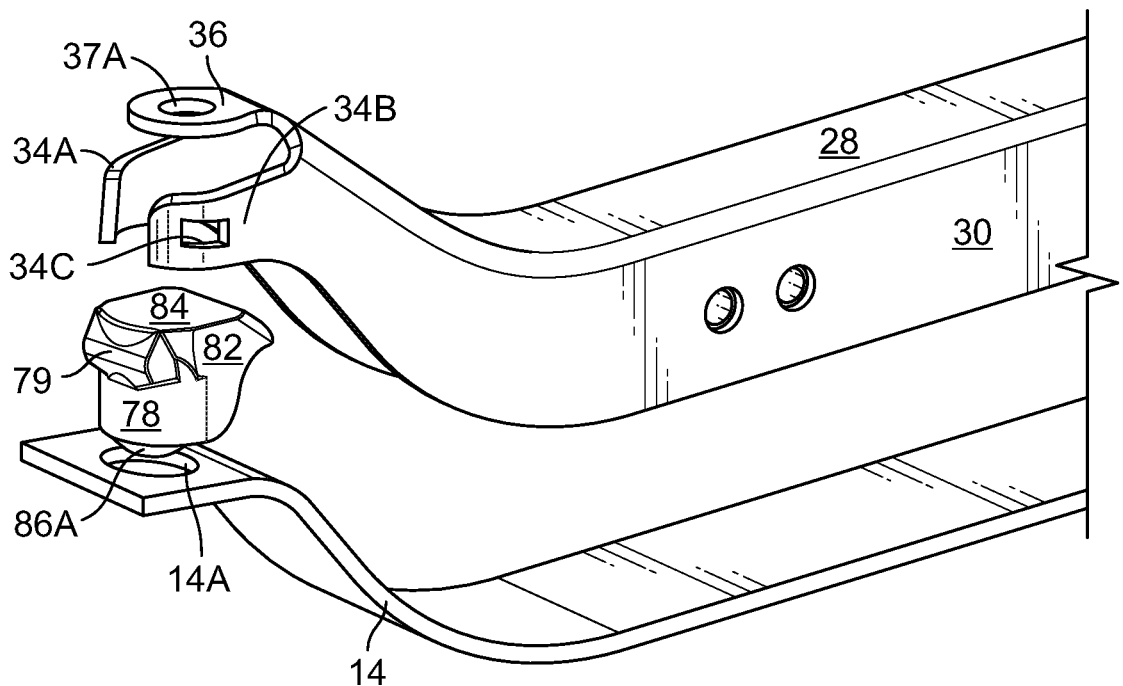
FIG. 11 is an exploded, rear, perspective view of the left side of selected components of a vehicle axle requiring further processing.
Figure 12:
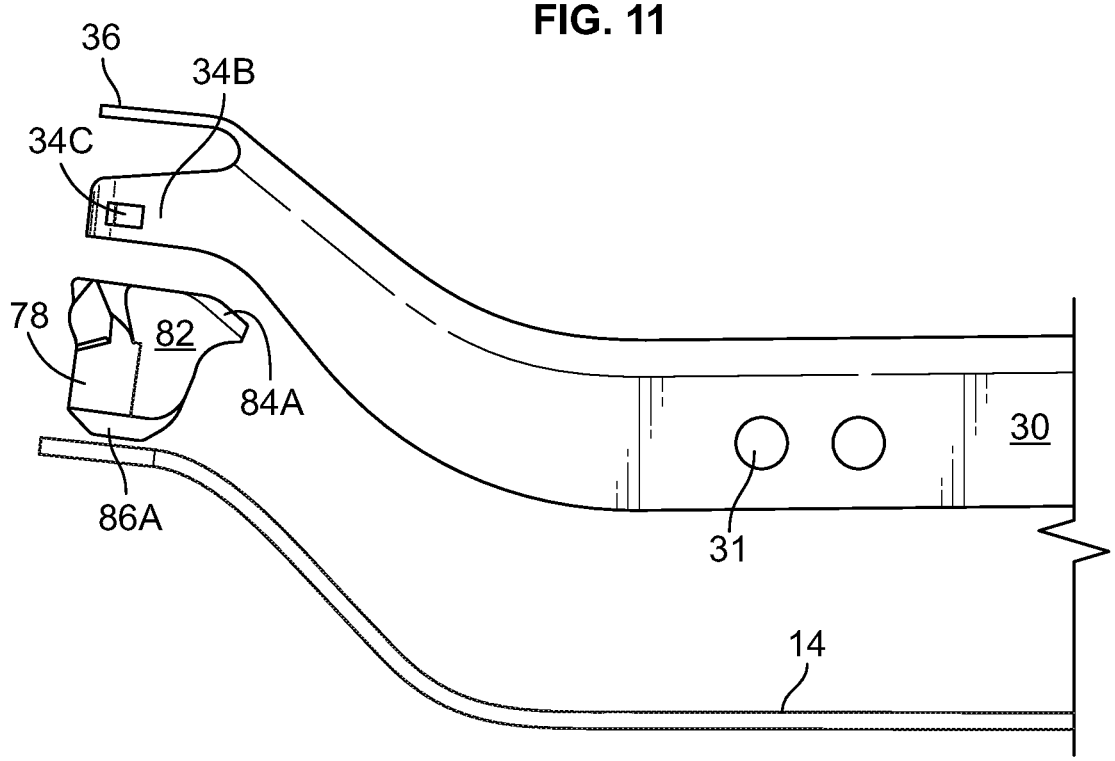
FIG. 12 is an exploded, rear, perspective view of the left side of a vehicle axle requiring further processing according to an aspect of the present disclosure.
Figure 19:
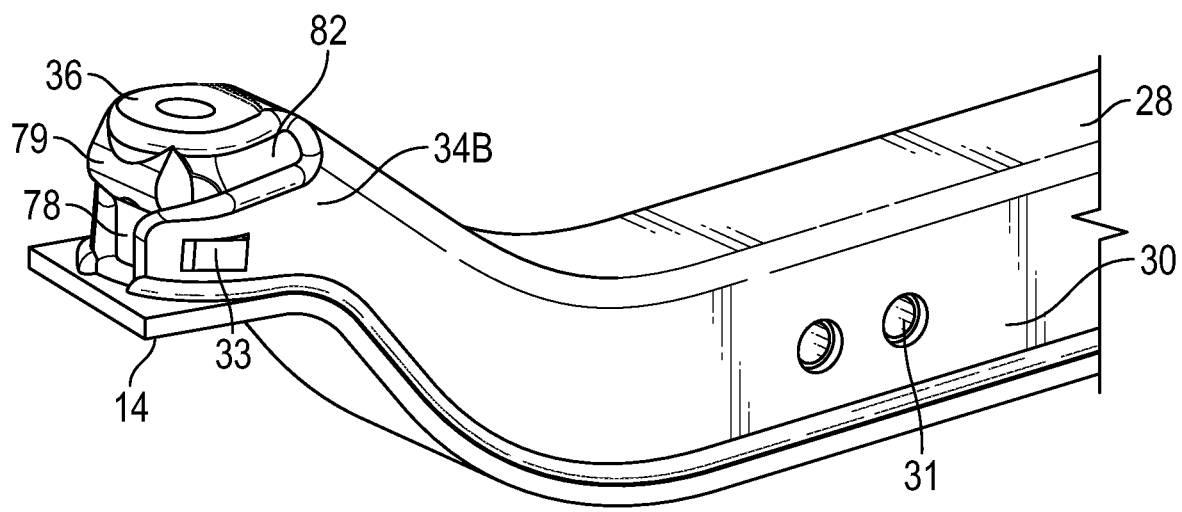
FIGS. 19-22 are respectively, perspective, end, rear elevational, and top plan views of the left side of a vehicle axle requiring further processing according to an aspect of the present disclosure.
Figure 20:
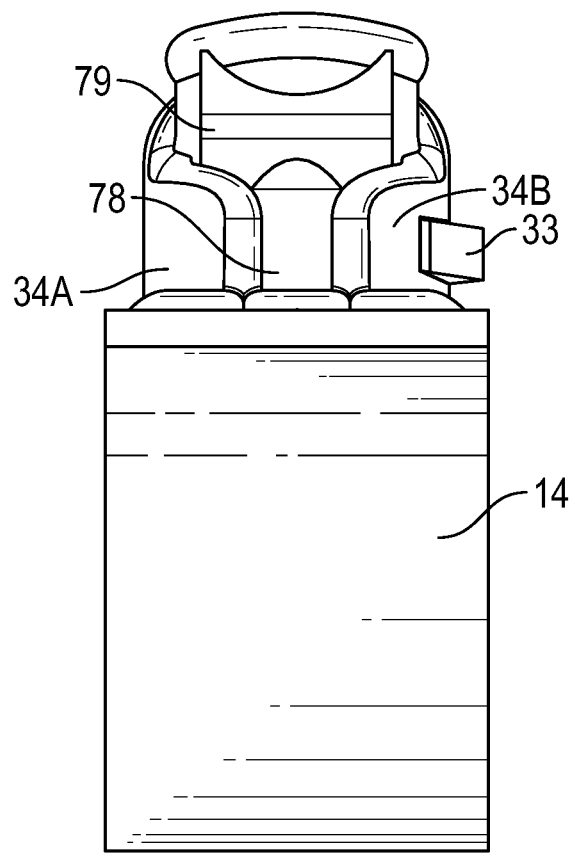
Figure 21:
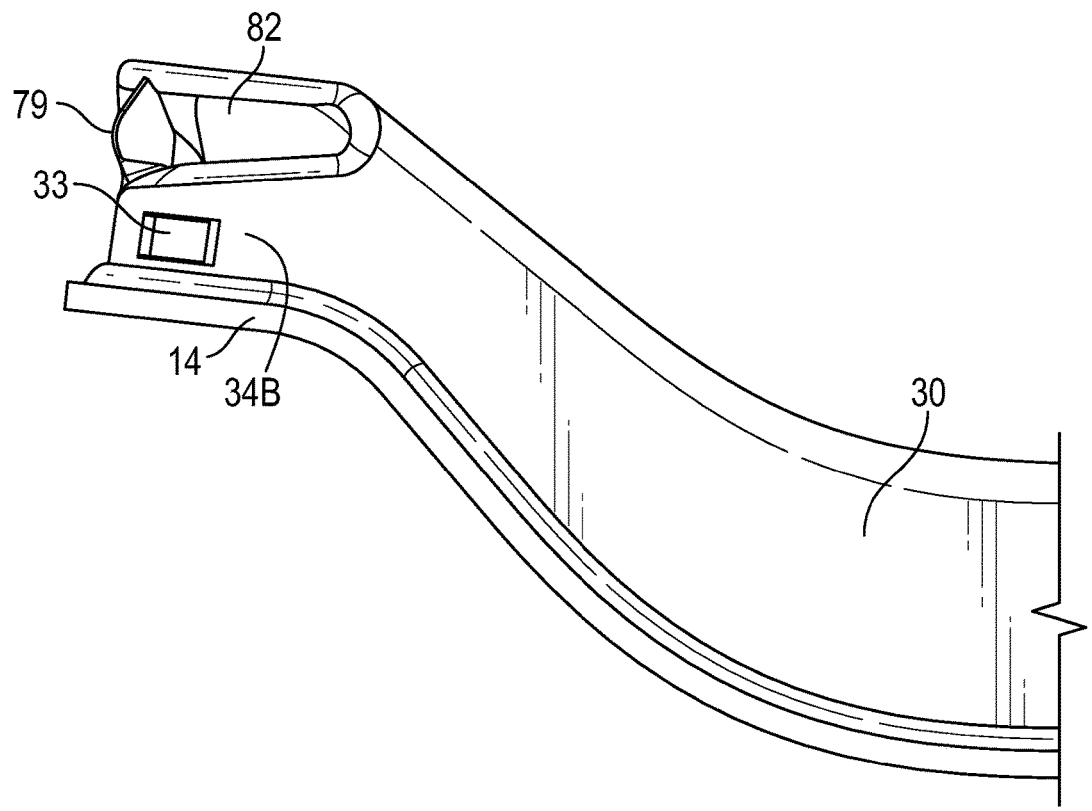
Figure 22:
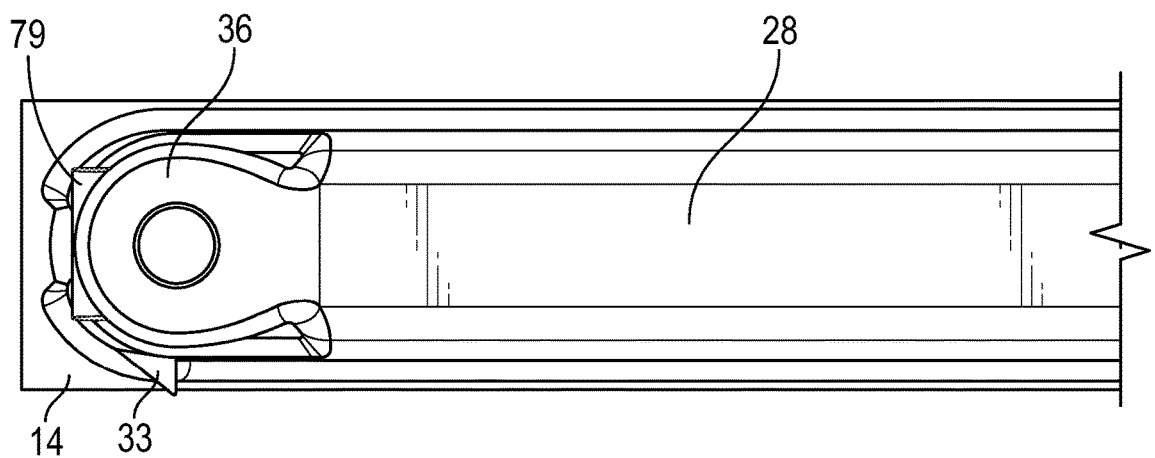

According to one method of manufacturing axle 10, a flat is subject to the forming steps illustrated in FIGS. 6A-6D. With the flat processed into an open-bottom channel, a head plate 16 is inserted into each end section 18, 25 of channel 12 via the open bottom (FIGS. 11-12). Front and rear wall end extensions 34A, 34B wrap at least partially around and separately join to the sidewalls of the head plates (FIGS. 11, 19-20). Distal ends of the front and rear wall end extensions 34A, 34B remain spaced apart (FIG. 20). Front and rear wall end extensions may be symmetrically arranged about their head plates (FIGS. 19-22), but such is not required. Front and rear wall extensions and their respective distal ends may wrap around less than half of the circumference of their respective head plates (including any percentage of the outboard surface of the head plate) while still achieving desired results.

When head plates are secured to channel 12, bottom plate 14 may also be secured to channel 12 to overlay the open bottom of channel 12. Bottom plate 14 may also be secured to the head plates 16 to further secure head plates in place. Thereafter, generally vertical king pin bores may be cut or otherwise formed in cover flap, head plate and bottom plate. Alternatively, each of cover flap 36, head plate 16, and bottom plate 14 may be provided with a pre-formed king pin bore prior to their being joined, but it may be advantageous to form a king pin bore after joinder to ensure proper alignment. Regardless of when formed, king pin bores may be substantially cylindrical (FIG. 39), complex cylindrical, frustoconical or a combination of any of the foregoing.

FIGS. 13-18 illustrate a head plate prior to drilling or forming any king pin bore or king pin fastener bore. In contrast, FIGS. 28-34 illustrate an example of the fully formed head plate 16 taken from a fully assembled axle.

Example head plate 16 is a substantially solid piece of material and may be constructed from various materials, including steel, iron, aluminum, alloys (e.g., SAE 8620 steel alloy) or other suitable, substantially rigid materials (see FIGS. 13-18 for head plate prior to formation of king pin and related fastener bores, and FIGS. 27-34 for finished head plate). It will also be appreciated that a head plate in accordance with the present disclosure may be manufactured by any suitable method, such as by forging, casting, machining or the like. Head plate 16 is generally positioned at the end section 18, 25 of the axle and/or occupies a cavity or void defined by front and rear wall end extensions 34A, 34B and cover flap 36 (if provided). FIG. 11. Head plate may include machined or formed surfaces configured to seat generally flush against the inner surfaces of channel 12. This may be advantageous to ensure proper orientation and more secure affixation of the head plate 12 within end section 18, 25 of axle 10.

As illustrated in FIGS. 29-34, example head plate 16 defines a top surface 84, a bottom surface 86, and a sidewall 60. Sidewall 60 extends between top surface 84 and bottom surface 86 and defines an inboard surface 76, an outboard surface 78, a front surface 80 and a rear surface 82. Head plate 16 also defines a plurality of bores which include a generally vertically oriented king pin bore 37 and one or more draw key bores 88, 90.

Figure 29:
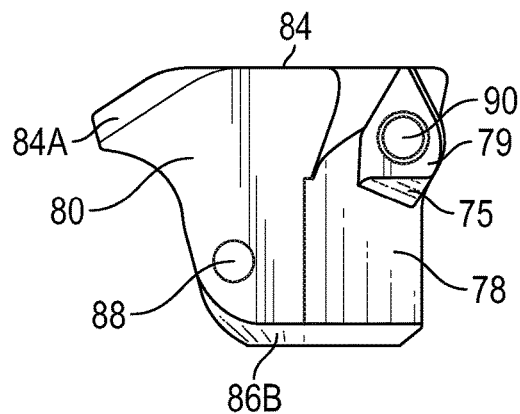
FIGS. 29-34 are respectively front, rear, outboard, inboard, top plan and bottom plan views of the head plate of FIG. 28.
Figure 30:
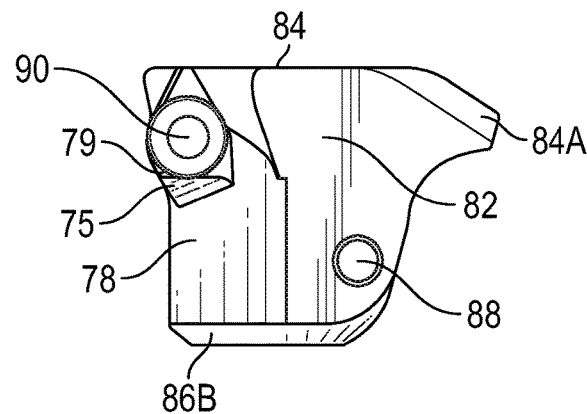
Figure 33:
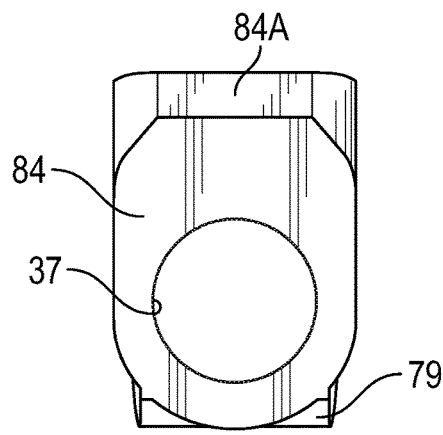

The top surface 84 of the illustrated head plate 16 is generally flat and may have a bevel or awning formation 84A on the inboard side as illustrated in FIGS. 29, 30, 33. The lateral edges of bevel 84A may also be rounded (FIG. 33).

Figure 27:
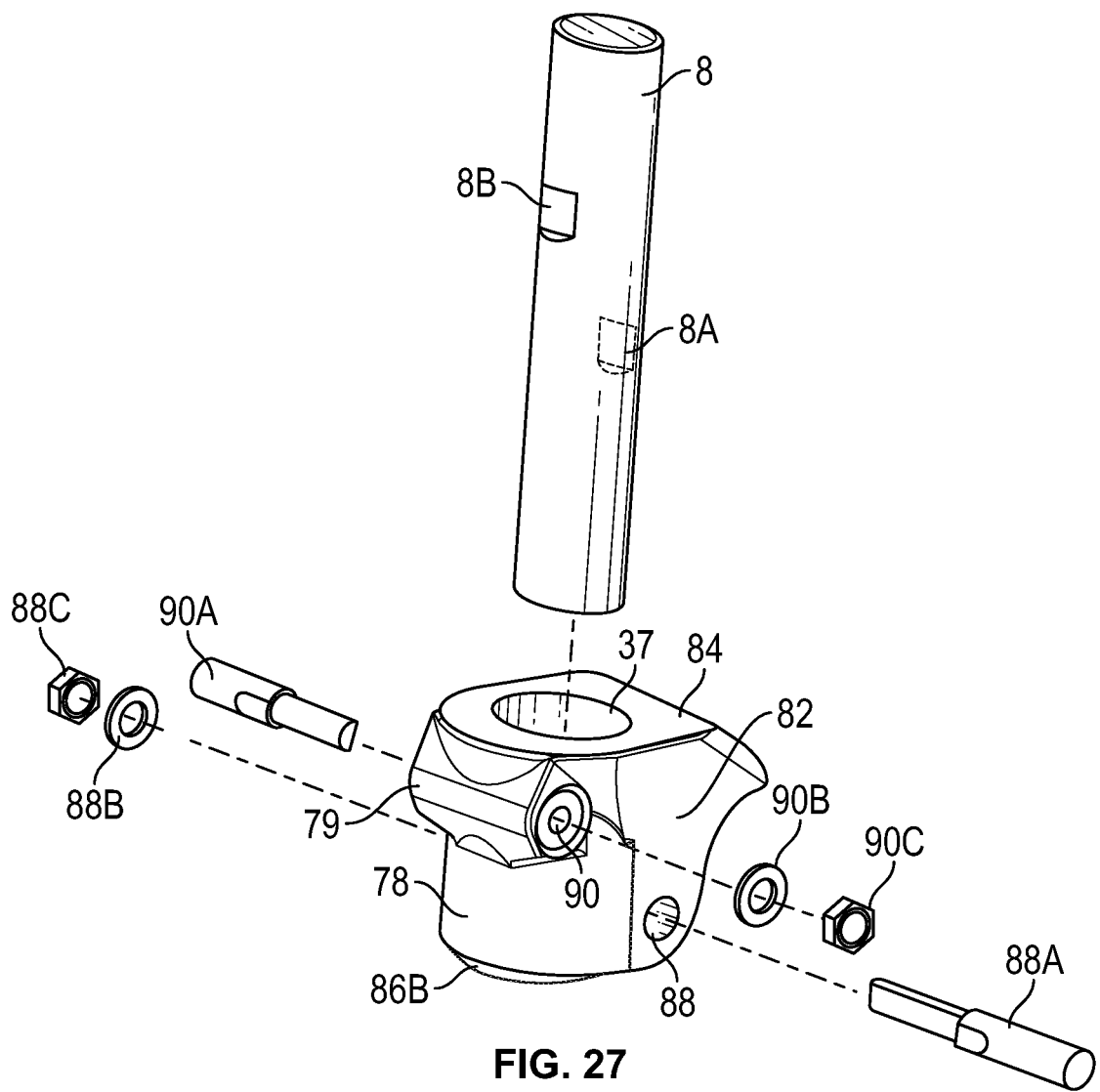
FIG. 27 is an exploded front perspective view of a king pin, head plate and draw keys according to an aspect of the present disclosure.
Figure 28:
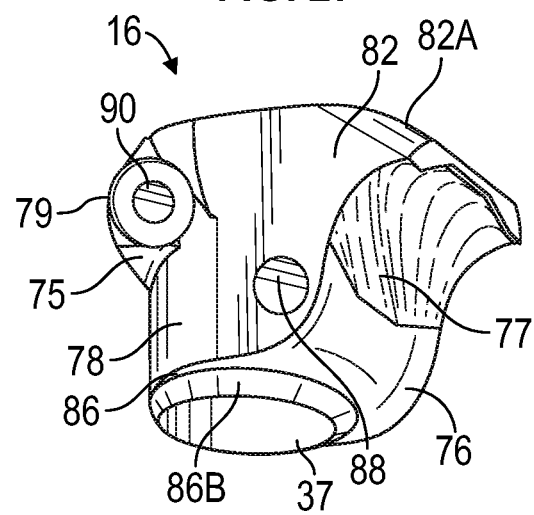
FIG. 28 is a perspective view of a finished head plate for a vehicle axle according to an aspect of the present disclosure.
Figure 34:
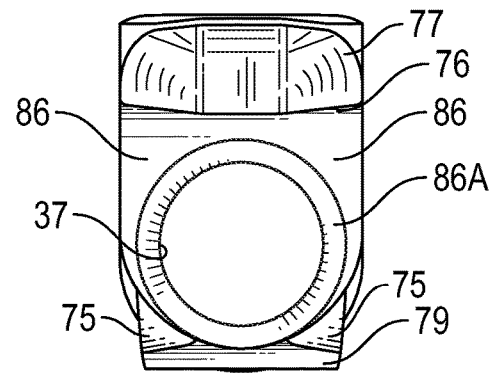

The bottom surface 86 of the illustrated head plate 16 defines a bottom surface extension or formation 86B adjacent the king pin bore (FIGS. 28, 34). The bottom surface formation, which in the case of head plate 16 of FIG. 28, is an angled or inclined surface 86B facing away from the king pin bore as it extends around its perimeter (FIGS. 28, 34). The portion of the bottom surface 86 on the front and rear sides of this inclined surface 86B is generally flat and widens as the bottom surface extends around the king pin bore in the inboard direction. (FIG. 28, 34). The bottom surface formation 86B of head plate 16 may be machined, for example, by drilling a king pin bore through a projection 86A, such as frustoconical projection, on the bottom surface of the head plate as further described and illustrated herein. (FIGS. 13, 15-16, 18). Preferably, the diameter of the king pin bore is slightly smaller than the diameter of the base of the bottom surface projection. (FIGS. 27, 28). Alternative bottom surface formations, including but not limited to other angled or inclined surfaces and extensions, may be machined or formed through other techniques known to those skilled in the relevant art.

Figure 23:
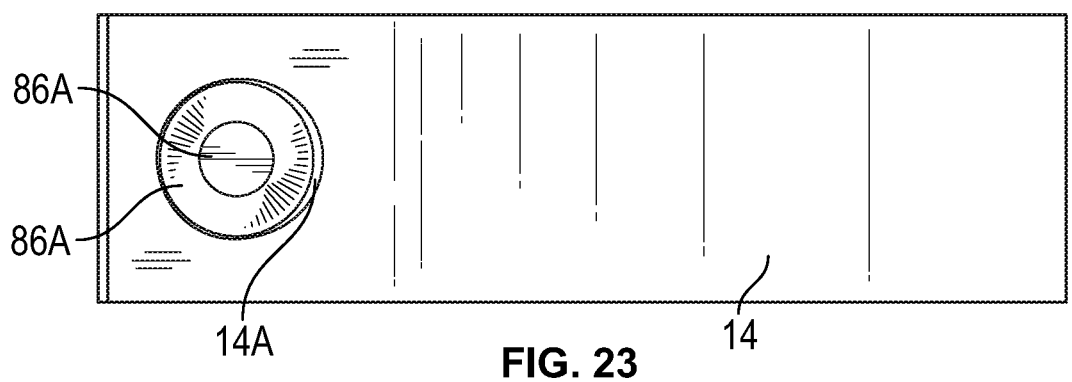
FIG. 23 is a slight perspective view of a bottom plate and head plate prior to the bottom surface of the head plate being welded to the bottom plate in accordance with an aspect of the present disclosure.
Figure 24:
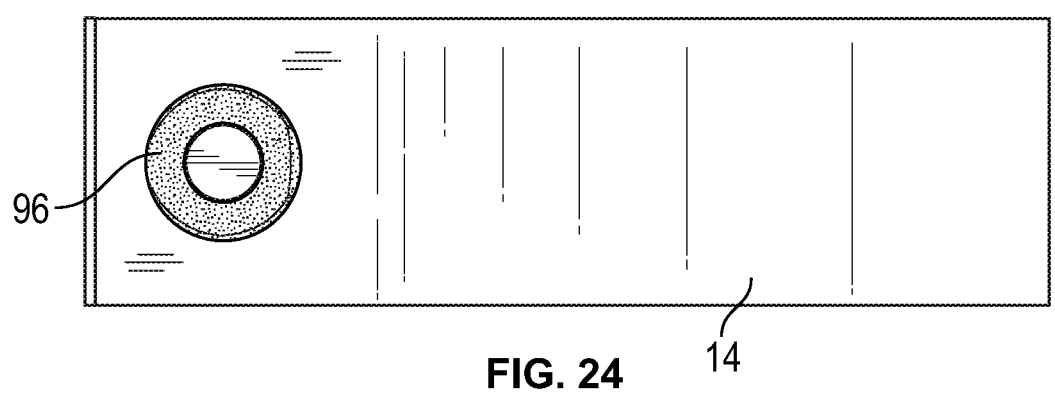
FIG. 24 is a slight perspective view of the bottom plate and head plate shown in FIG. 23 after the bottom surface of the head plate is welded to the bottom plate in accordance with an aspect of the present disclosure.
Figure 25:
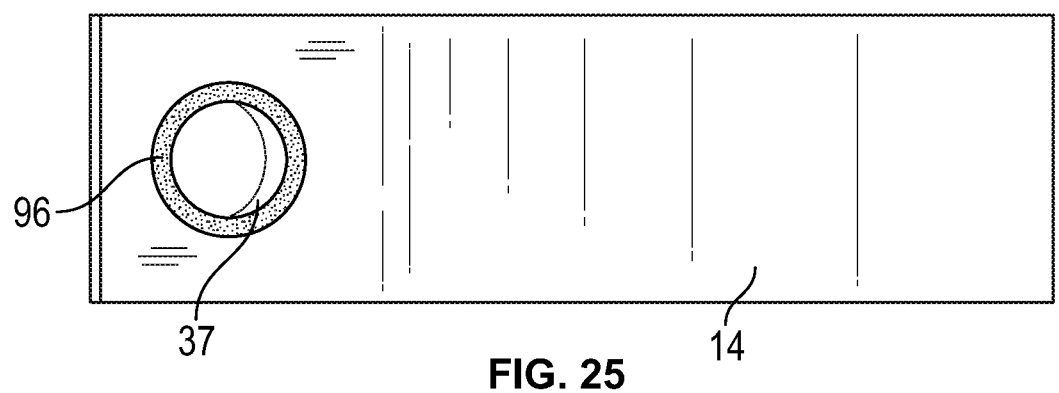
FIG. 25 is a slight perspective view of the bottom plate and head plate shown in FIG. 24 after a king pin bore is drilled through the head plate.
Figure 26:
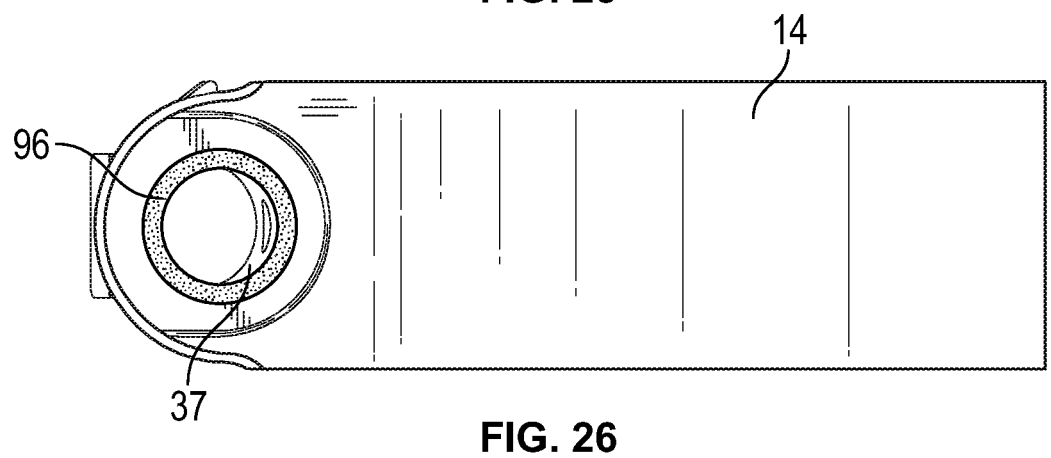
FIG. 26 is a slight perspective view of the bottom plate and head plate shown in FIG. 25 after further processing.
Figure 40:
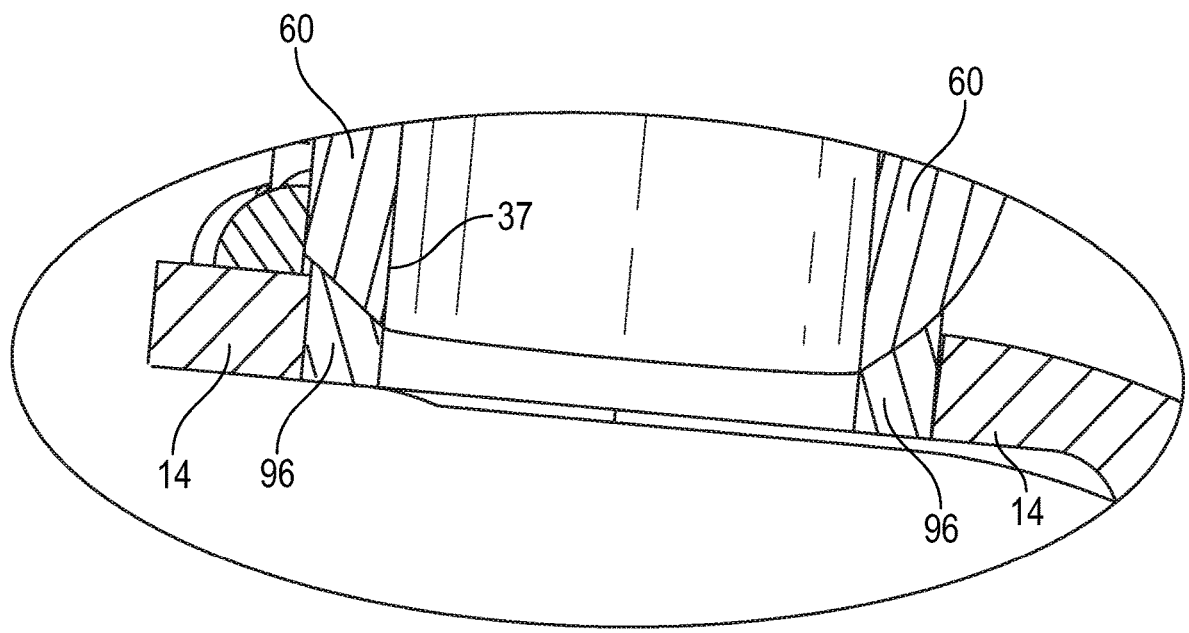
FIG. 40 is an enlargement of a select portion of the cross-sectional view of the vehicle axle of FIG. 39.

FIGS. 23-26 illustrate select steps of an example method by which the bottom surface 86 of head plate 16 may be welded to bottom plate 14 and a king pin bore may be formed in head plate 16. FIG. 26 illustrates the relative position of the bottom surface 86 of head plate 16 and bottom plate 14 before a weld is formed therebetween. (FIGS. 11,12). Preferably, at least one portion of the bottom surface of head plate 16 is received or seated in an opening or bore in the bottom plate. (FIG. 23). The bottom surface 86 of head plate 16 and the bottom plate 14 may be in contact, as illustrated in FIG. 23, or may also be in close proximity to one another without departing from the scope of the present disclosure. Welding of head plate bottom surface 86 to bottom plate 14 then proceeds (FIG. 27). If the head plate bottom surface includes a projection 86A, such as frustoconical projection (FIG. 13), a generally vertically oriented king pin bore 37 drilled generally through the center of the bottom plate may extend through the initial weld 96 (FIG. 24) and through head plate 16 (FIG. 25), so as to intersect at least a portion of a lateral edge or face of the projection 86A (FIGS. 13-16) on the bottom surface 86 of the head plate 16. The bottom surface 86 of the head plate and the portion of bottom plate 14 surrounding the king pin bore 37 may then undergo spotfacing or other appropriate machining to smooth the surface to ensure proper fit and rotation of the steering knuckle (not shown) around the king pin (FIG. 26). A vertical cross section of the resulting weld 96 (FIGS. 26, 40) between head plate bottom surface 86 and bottom plate 14 may have a rectangular trapezoidal shape (FIG. 40). The three dimensional shape of weld 96 may resemble a ring or a toroid. The height of the weld 96 at its outer diameter may be greater than at its inner diameter (FIG. 40). Weld 96 may contribute to the even distribution of stresses throughout the axle and in particular the head or end sections.

Figure 39:
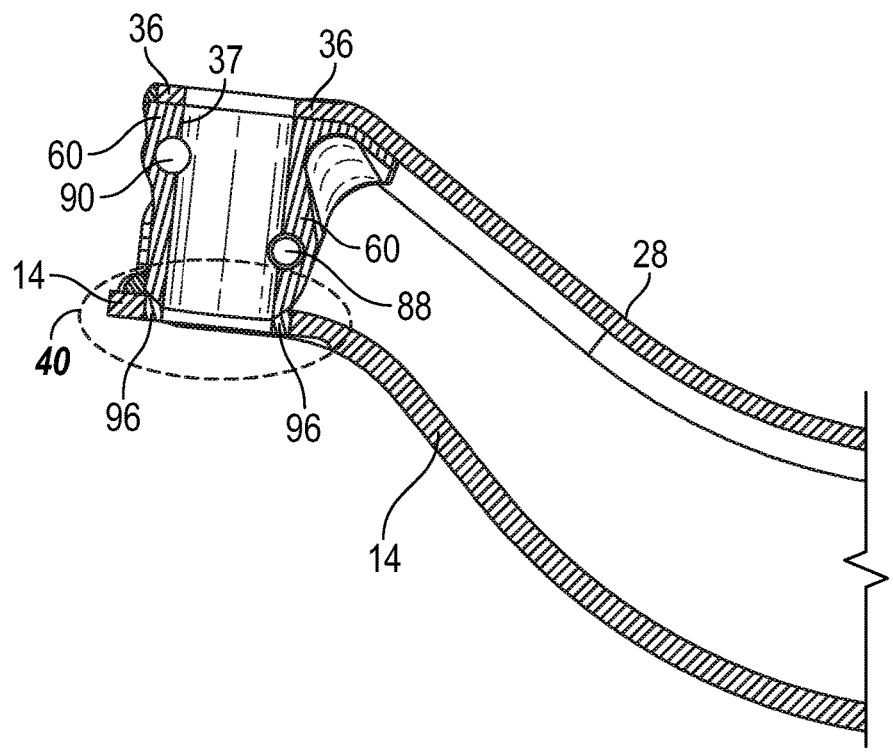
FIG. 39 is a cross-sectional view of the embodiment shown in FIG. 37, taken along lines 40-40 thereof.

The inboard surface 76 of the sidewall 60 of head plate 16 may include an indentation or pocket 77 in the upper portion (FIGS. 28-32), which assists in reducing the stiffness gradient at the channel-head plate interface, thereby increasing axle and related component fatigue life. (FIG. 39). A suitable indentation or pocket may also be created or enhanced on the inboard surface 76 of the sidewall 60 by extending the front and rear surfaces 80,82 of sidewall 60 and the top surface 84 of head plate 16 in the inboard direction. (FIG. 28).

Figure 31:
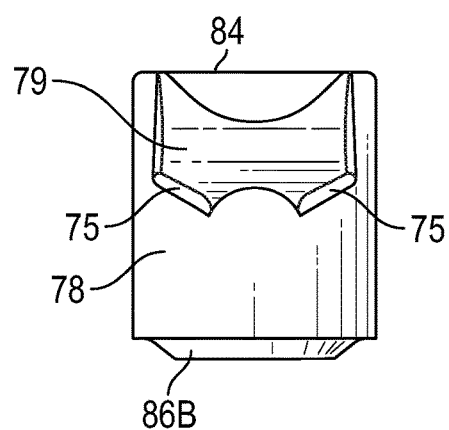
Figure 32:
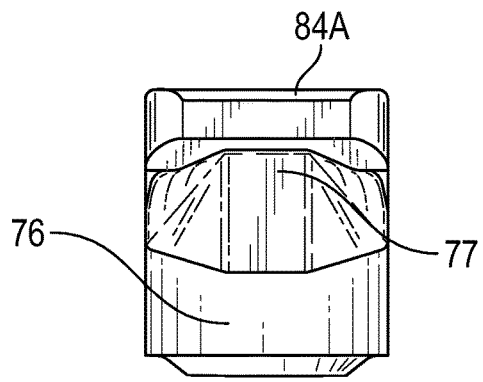
Figure 35:
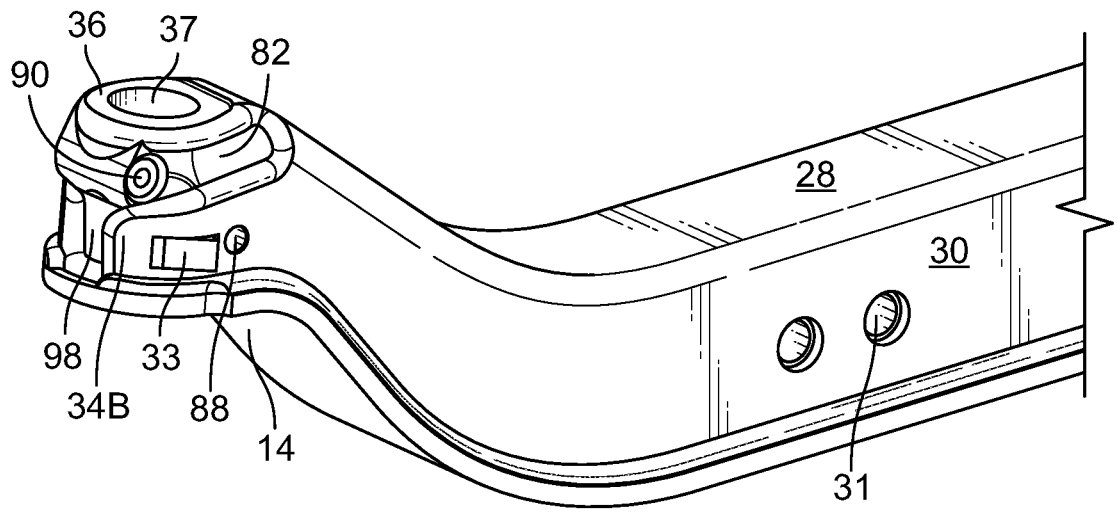
FIGS. 35-38 are perspective, end, rear elevational, and top plan views of the left side of the vehicle axle shown in FIG. 19-22 having undergone further processing.
Figure 36:
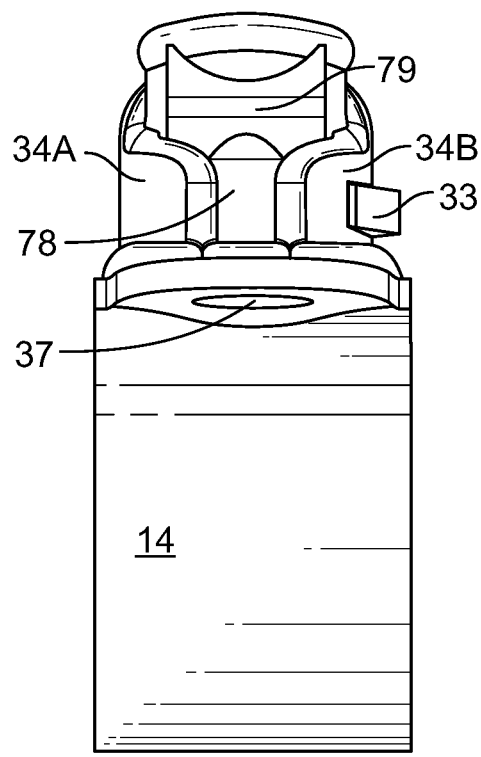
Figure 37:
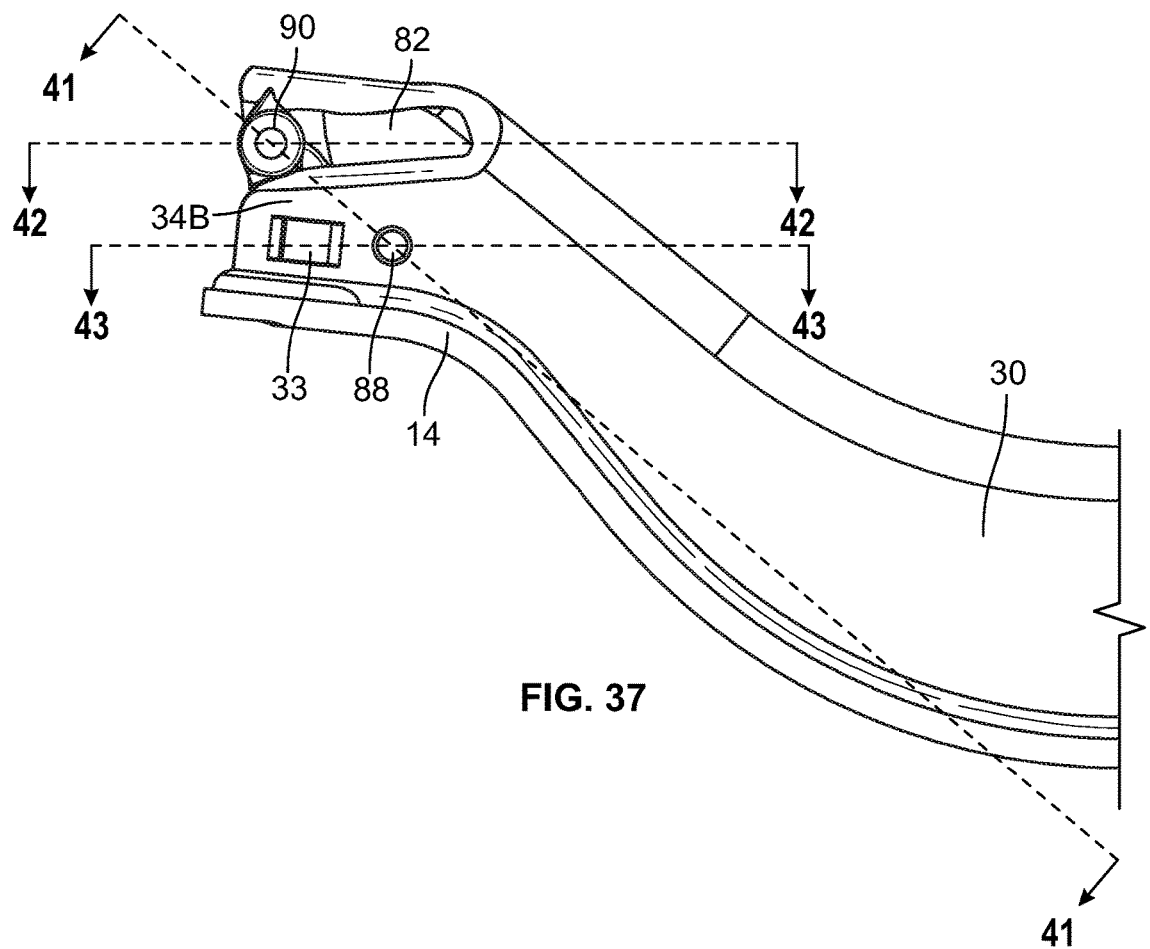
Figure 38:
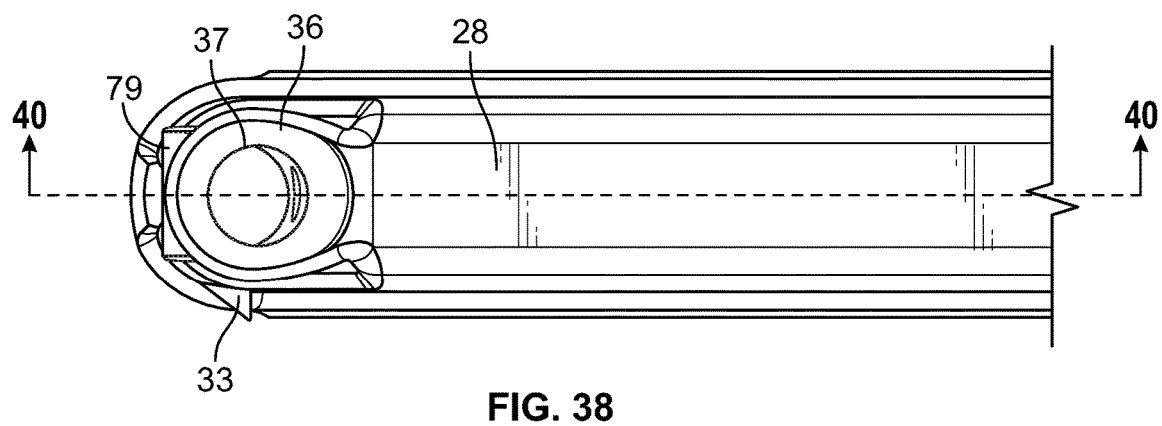

The outboard surface 78 of the sidewall 60 of the illustrated head plate 16 may project a portion of a generally horizontally oriented and generally cylindrical or other elongated formation 79 incorporating a king pin fastener or draw key bore 90 if head plate 16 employs a draw key 90A on the outboard side of the king pin. (FIG. 5, 27). In example head plate 16, the elongated formation 79 incorporating an outboard draw key bore is also vertically offset from inboard draw key bore 88. This configuration also provides clearance for front and rear wall end extensions 34A,34B to be secured to the head plate in a number of locations, such as for example illustrated in FIGS. 35, 36 where the distal ends of front and rear wall end extensions 34A,34B are welded on the outboard surface 78 of sidewall 60 in close proximity to elongated formation 79. Grooves 75 on the underside of the longitudinal ends of formation 79 (FIGS. 29-34) provide additional space for welding operations and allow weld to accumulate along the upper edge of front and rear wall end extensions 34A,34B (FIGS. 35-36). A lower portion of the outboard surface 78 of the sidewall of head plate 16 may be semi-cylindrical in shape as the side wall extends from the back surface (FIG. 30) to the front surface (FIG. 29) on the outboard side of head plate 16 (FIG. 31).

The front surface 80 (FIG. 29) and rear surface 82 (FIG. 30) of the sidewall 60 of the illustrated head plate 16 are generally flat and generally parallel to one another as these surfaces extend outboard from the inboard edge of head plate 16 to a location approximately even with the central longitudinal axis of the king pin bore 37. From this location outboard, the lower portion of the sidewall may be generally semi-cylindrical in shape (FIGS. 29, 30, 31).

Figure 41:
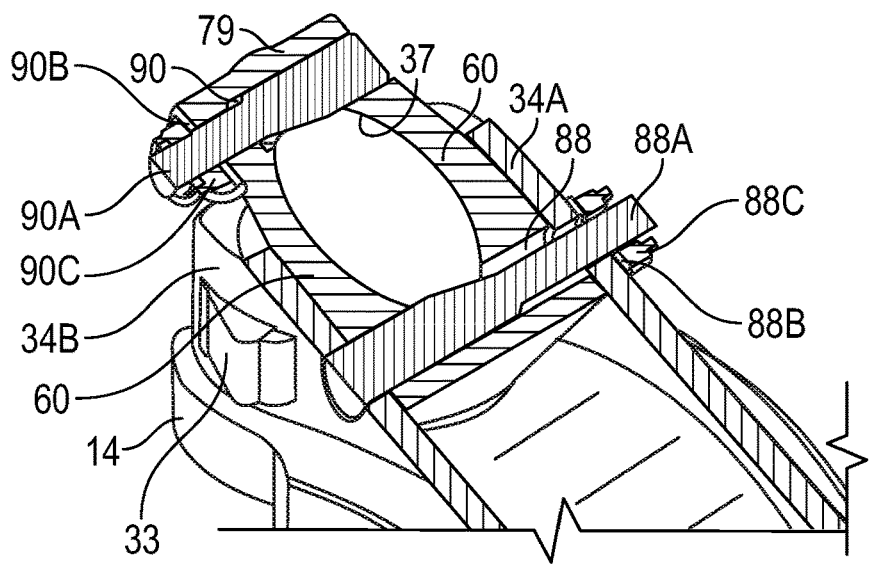
FIG. 41 is a partial cross-sectional view of the vehicle axle shown in FIG. 37, taken along lines 41-41 thereof.
Figure 42:
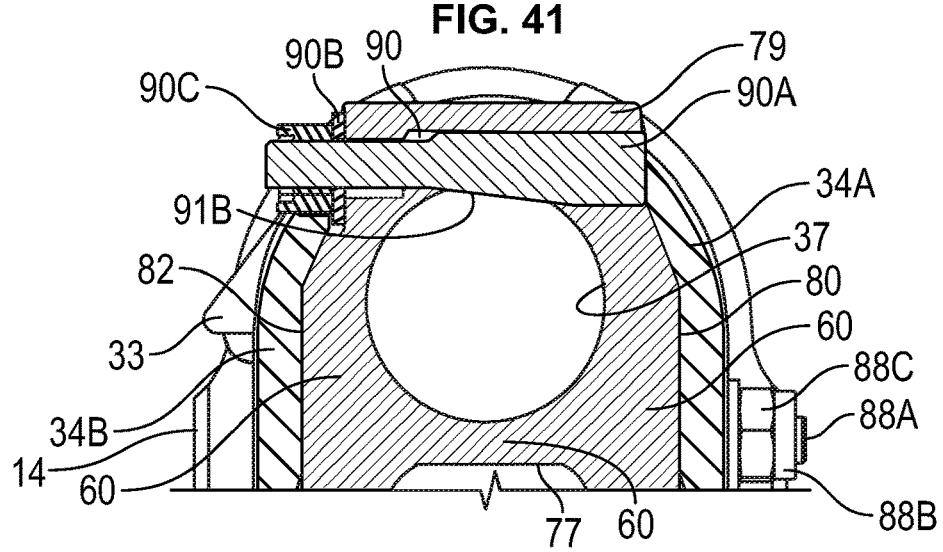
FIG. 42 is a partial cross-sectional view of the vehicle axle shown in FIG. 37, taken along lines 42-42 thereof.
Figure 43:
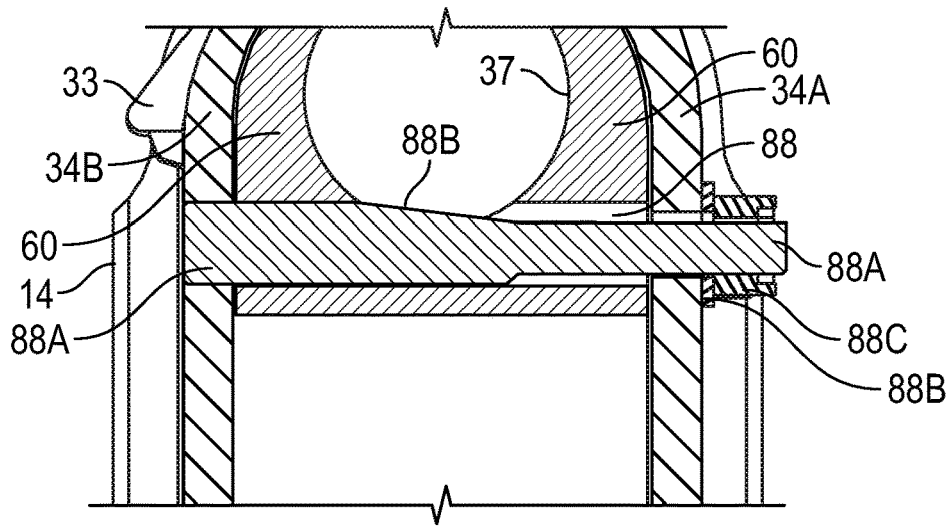
FIG. 43 is a partial cross-sectional view of the vehicle axle shown in FIG. 37, taken along lines 43-43 thereof.

Head plate 16 also defines a generally vertically oriented king pin bore 37 and one or more king pin fastener or draw key bores 89, 90 which allow for a removable king pin. The generally vertically oriented king pin bore extends between bottom surface 86 and top surface 84. First and second king pin fastener or draw key bores 88, 90 partially intersect the king pin bore and extend through head plate (FIGS. 41-43). In example head plate 16, they also are positioned in opposite directions and on opposing sides of the king pin bore 37 (i.e., outboard and inboard sides) and are generally horizontally disposed and generally parallel to one another. (FIGS. 5, 27, 41-43). Corresponding first and second king pin fasteners or draw keys each include an elongated head 89A, 91A having a tapered flat 89B, 91B which transitions into a threaded shaft 89C, 91C. (FIGS. 41-43). The tapered flat 89B, 91B of each draw key engages a corresponding flat 8A, 8B (FIG. 27) or other suitable irregularity on the king pin to prevent rotational and vertical movement of the king pin in relation to head plate 16 during vehicle operation. The threaded shaft portion 89C, 91C of the draw key engages a washer and a nut or other suitable connector or connector and washer combination (89B, 88C, 90B, 90C), which when tightened, removably secures the king pin and the draw key in place.

As described and illustrated herein, a king pin fastener bore may be defined by the head plate without front or rear wall end extensions 34A, 34B (FIGS. 41, 42), or alternatively, by the head plate and by front and/or rear wall end extension 34A, 34B (FIGS. 41, 43)

A head plate in accordance with the present disclosure may be outfitted with a two draw key configuration wherein first and second draw keys are positioned on opposite sides (FIG. 41) or on the same side of the king pin bore 37. A draw key bore may also be configured to have substantially the same diameter at each end, allowing the corresponding draw key to be oriented in either direction during vehicle operation. A draw key bore, however, may be configured to require the draw key to be oriented in only one direction, such as for example, by reducing the diameter of the draw key bore occupied by the threaded shaft portion of the draw key. (FIGS. 41-43). A reduction or other change in diameter of a draw key bore can be introduced by head plate 16, such as in the sidewall 60 of head plate 16 (FIG. 42), or by a vertically oriented channel wall, including a front or rear wall end extension 34A, 34B (FIG. 43), or both.

While the illustrated draw key configuration for head plate 16 utilizes two draw keys in the manner described and illustrated herein, a head plate utilizing more than one draw key may orient each draw key in the same direction and/or provide more than one draw key on the same or on different sides of a king pin bore, space permitting, without departing from the scope of the present disclosure. Alternatively, a head plate in accordance with the present disclosure may utilize a single draw key configuration wherein the corresponding draw key bore may be positioned in any one of a number of locations, including on the inboard or the outboard side the king pin bore.

FIGS. 44-82 illustrates another embodiment of a fabricated axle with removable king pin according to the present disclosure.

The embodiment of FIGS. 44-82 differs from the particular features illustrated in FIGS. 1-43. In the embodiment of FIGS. 44-82, (1) the front and rear wall end extensions 134A, 134B of the U shaped channel wrap substantially around and separately join to the sidewall of the head plate such that distal ends of the front and rear wall end extensions are positioned in close proximity to one another on the outboard side of the head plate, (2) grooves or cut outs 162,162B in the bottom edge of the front and rear wall end extensions 134A,134B, respectively, space the bottom edge of the front and rear wall end extensions 134A,134B apart from the top surface of the bottom plate 114, (3) the bottom surface 186 of head plate 116 is generally flat and permits head plate 116 to sit flush on the top surface of bottom plate 114. and (4) the bottom plate 114 is machined to provide an edge surface 114a that may serve as a steering stop in lieu of the steering stop insert or projection in a window of the rear wall end extension.

Figure 44:
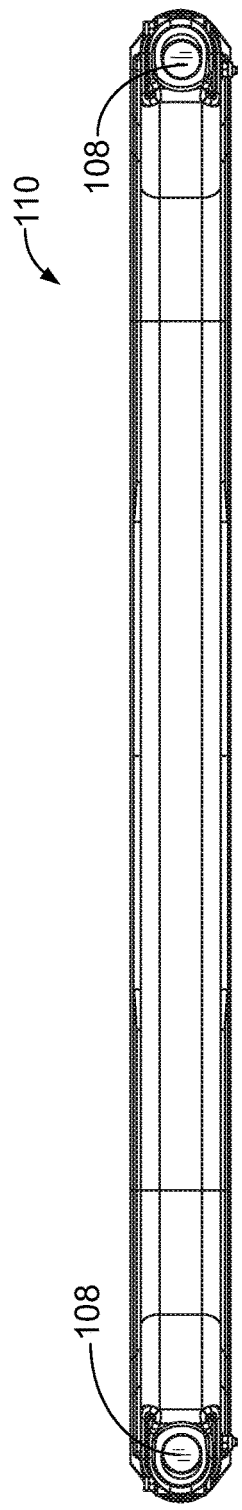
FIG. 44 is a top plan view of a vehicle axle according to a second embodiment of the present disclosure.
Figure 45:
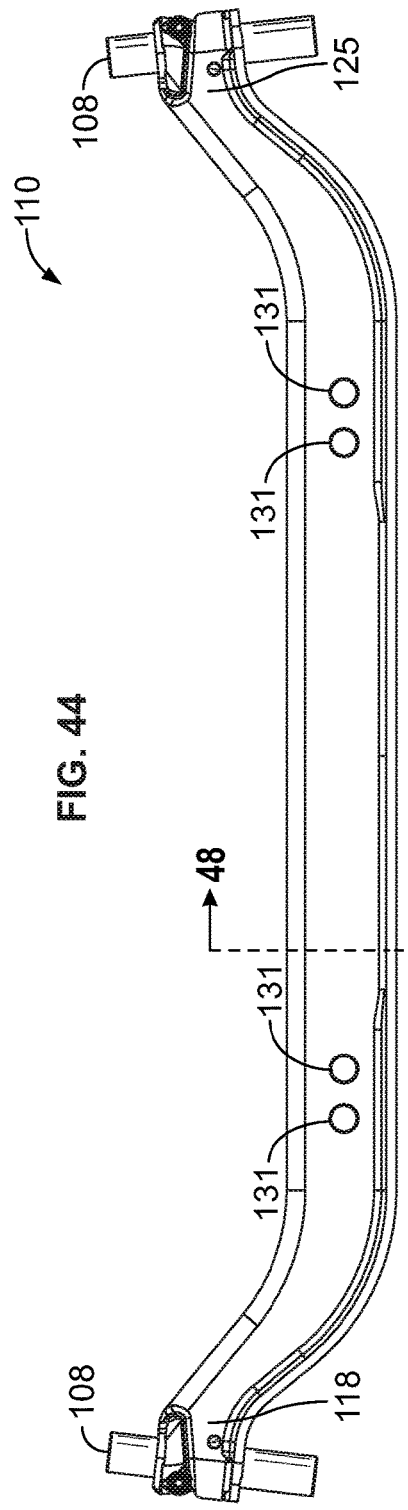
FIG. 45 is a rear elevational view of the vehicle axle of FIG. 44.
Figure 46:
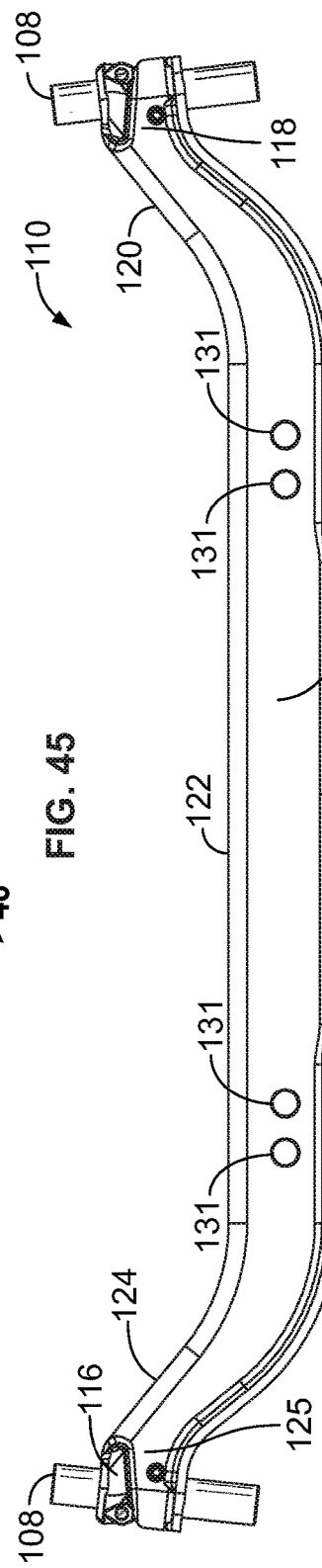
FIG. 46 is a front elevational view of the vehicle axle of FIG. 44.

In FIGS. 44-46, axle 110 includes a channel 112 and a bottom plate 114 together forming a main body 115. The main body 115 has a first gooseneck section 120, a midsection 122, and a second gooseneck section 124. Axle 110 also has first and second end (head) sections 118, 125 at each end thereof. A head plate 116, further described and illustrated herein, is positioned at each head section 118, 125 of axle 110. Channel 112, bottom plate 114 and head plates 116 are secured together, for example by welding operations, along their respective points and lines of intersection. Channel 112 and bottom plate 114 may be made from a variety of suitable materials, such as 100KSI sheet steel or other suitable high-strength low alloy ("HSLA") steel. A king pin 108 in its desired position permits mounting of a steering knuckle (not shown).

Channel 112 has an inverted U-shaped vertical cross-section at those portions thereof associated with the midsection 122 and the first and second gooseneck sections 120, 124 of main body 115. Channel 112 includes a front wall 126, a top wall 128 and a rear wall 130. Front and rear walls 126,130 may include axle seat bolt holes 131 to permit mounting of an axle seat for suspension components (see also FIGS. 45,46).

Figure 47A:
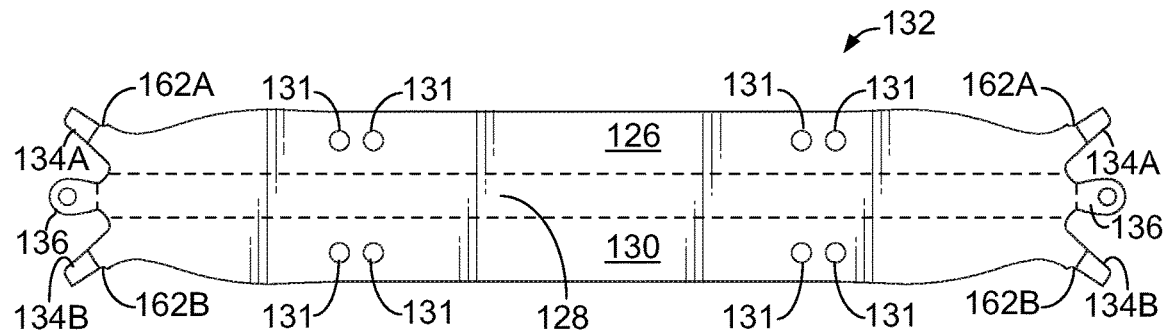
FIG. 47A is a plan view of material used to form the channel structure used to make the vehicle axle shown in FIGS. 44-46.

FIGS. 47A-47D illustrate four progressive steps for forming channel 112. It should be understood that the illustrated process is merely exemplary and that other manufacturing methods (including modifications to the described methods) may be practiced without departing from the scope of the present disclosure. FIG. 47A illustrates a first step wherein a flat 132 is cut or otherwise removed from a rectangular blank of material. Flat 132 includes front wall 126, top wall 128 and rear wall 130. Flat 132 is shaped to include tab-like front and rear wall end extensions 134A, 134B extending from each lateral end (i.e., the left and right ends) of each of the front and rear walls 126,130. Front and rear wall end extensions 134A,134B are narrowed by grooves or cut-outs 162A,162B, respectively, creating a gap between the bottom edge of the front and rear wall end extensions 134A,134B and the bottom plate when fully assembled. Axle seat bolt holes 131 may be cut or formed in flat 132. Front and rear wall end extensions 134A, 134B may be bent upward along bend lines 135A, 135B to the configuration of FIG. 47B.

Figure 47B:
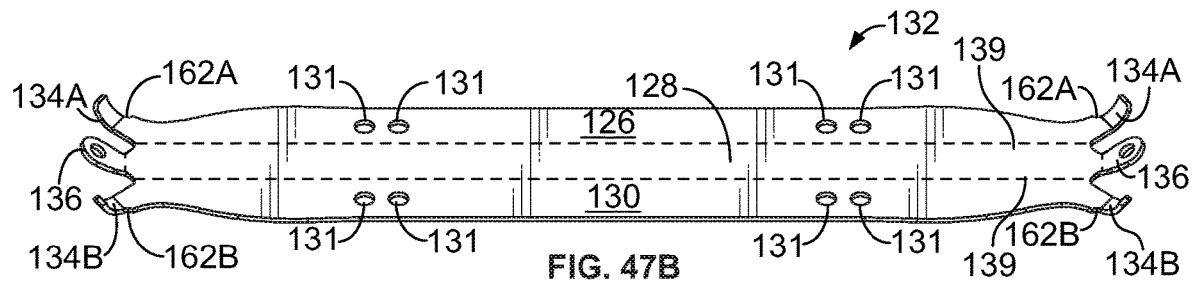
FIG. 47B is an a perspective view of the material shown in FIG. 47A after undergoing initial processing.

Flat 132 may also be shaped to include optional tab-like extensions 136 extending from each end of the top wall 128. As further described herein, tab-like extensions 136 correspond to axle head cover flaps for axle 110. Cover flap holes 137 may be formed in flat 132 within each tab-like extension 136, as shown in FIGS. 47A-47B. Tab-like extensions 136 may be bent upward along bend lines 138 to the configuration of FIG. 47B.

Flat 132 is preferably built into the rectangular blank of material, as described, eliminating the need to trim the bottom edge of channel 112 once it is bent and formed to mate with bottom plate 114. Laser or machining this profile after bending is technically feasible but would require costly equipment and take considerable time.

Figure 47C:
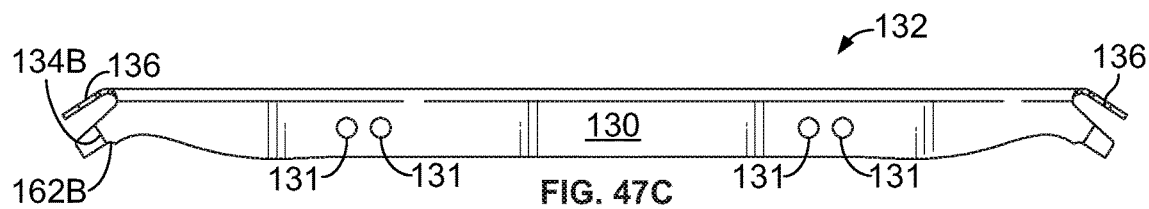
FIG. 47C is an elevational view of the material shown in FIG. 47B after undergoing further processing.
Figure 47C:
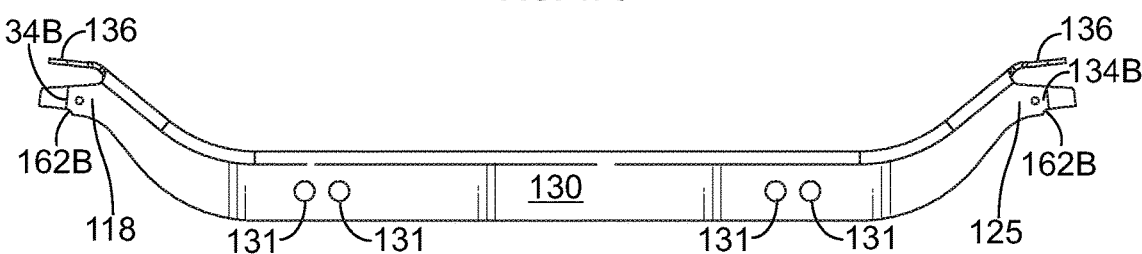
Figure 48:
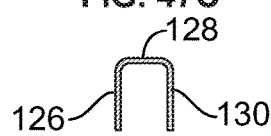
FIG. 48 is a portion of a cross-sectional view of the vehicle axle shown in FIG. 45, taken along lines 48-48 thereof.

FIG. 47C illustrates a third step in forming channel 112 wherein flat 132 illustrated in FIG. 47B is bent along bend lines 139 illustrated therein. During this bending of flat 132, each end of channel 112 is partially closed off by end extensions 134A and 134B which are respectively the end extensions of front wall 126 and rear wall 130. Each end of channel 112 is also partially covered by extension 136 (if present) serving as a cover flap for the channel end.

FIG. 47D illustrates a fourth step in forming channel 112 wherein the channel is further bent upwards at its end portions so that it assumes an inverted gull-wing type shape when viewed from the front or rear. In this step, channel 112 is formed to define the portions thereof associated with the upwardly and outwardly extending gooseneck sections 120, 124 of main body 115 and the primarily outwardly extending head sections 118, 125 of axle 110 (see also FIGS. 45, 46). The portions of channel 112 associated with the gooseneck sections 120, 124 of main body 115 are substantially identical to each other and separated by a portion of the channel associated with the generally straight midsection 122 of the main body (see also FIGS. 45, 46). This fourth step for forming channel 112 may be carried out by a number of beam-bending or rolling techniques, or other forming methods, such as, for example, (1) stamping in a male/female die set contoured to the final shape, (2) using a press brake with side bolsters to inhibit side wall deformation, (3) fluid cell (bag) press, (4) roll forming, (5) stretch forming, and (6) hydroforming. Any of the example channel forming methods, described or referred to herein in connection with channel 12 shown in FIG. 6D, such as the one hit and two hit methods, may be used to form channel 112.

Figure 49:
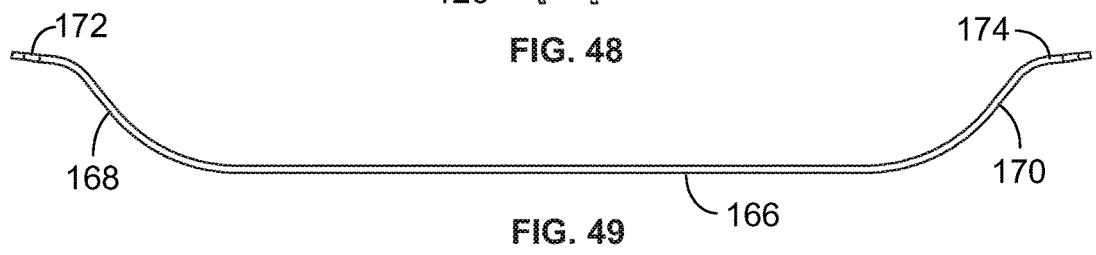
FIG. 49 is an edge view of the bottom plate structure used in the vehicle axle shown in FIGS. 44-46.
Figure 50:
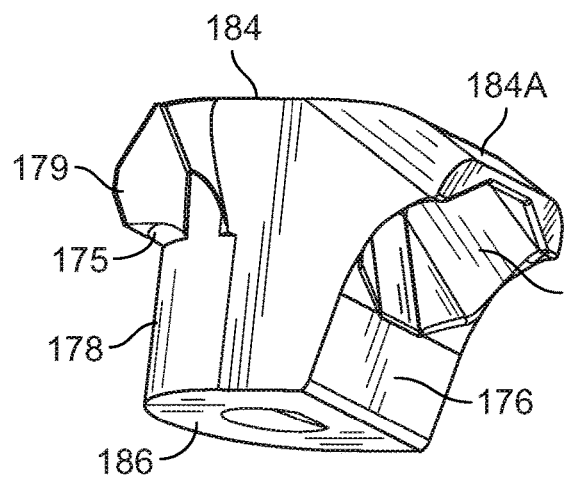
FIG. 50 is a perspective view of a head plate requiring further processing for a vehicle axle according to a second embodiment of the present disclosure.
Figure 51:
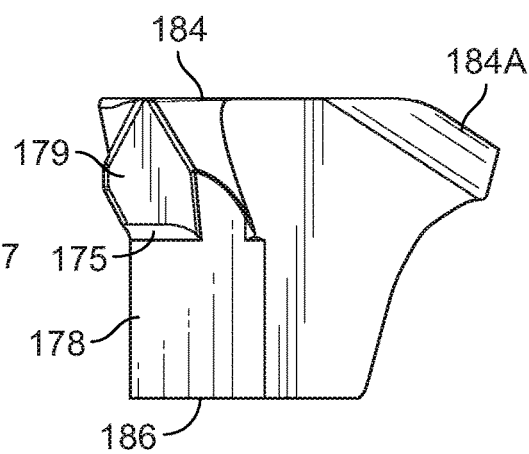
FIG. 51 is an elevational view of the head plate of FIG. 50.
Figure 52:
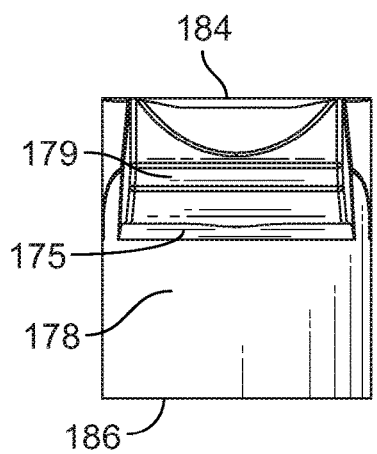
FIG. 52 is an outboard side, elevational view of the head plate of FIG. 50.
Figure 53:
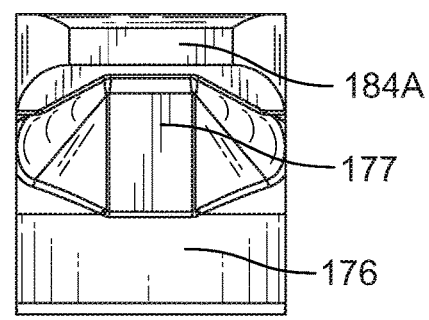
FIG. 53 is an inboard side, elevational view of the head plate of FIG. 50.
Figure 54:
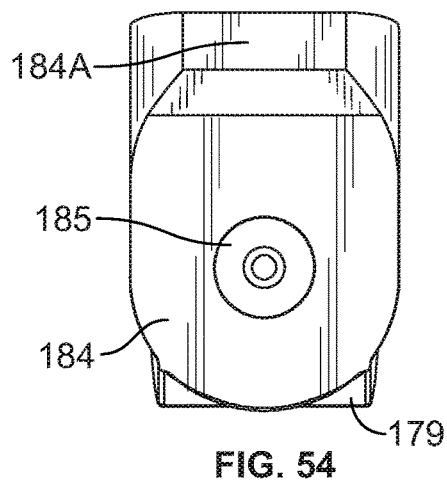
FIG. 54 is a top plan view of the head plate of FIG. 50.
Figure 55:
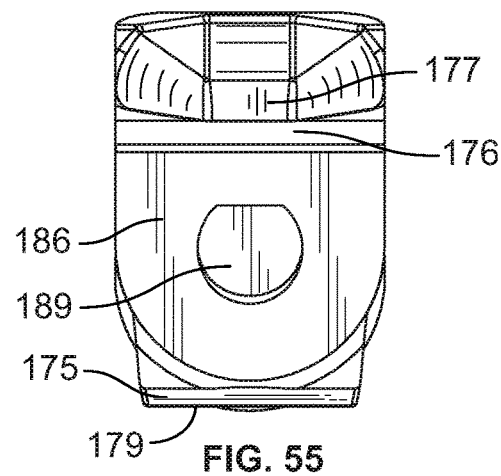
FIG. 55 is a bottom plan view of the head plate of FIG. 50.
Figure 56:
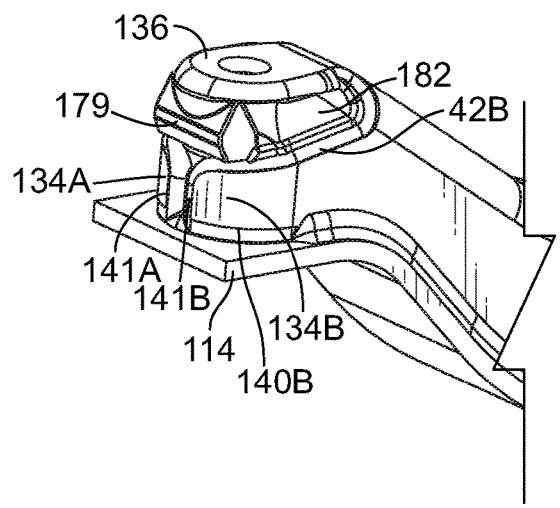
FIGS. 56-59 are respectively, perspective, end, rear elevational, and top plan views of the left side of a vehicle axle requiring further processing according to a second embodiment of the present disclosure.

FIG. 49 illustrates the bottom plate 114 of the axle 110. The bottom plate 114 is provided as a rectangular strip of material that is formed (e.g., by bending) to provide a substantially flat body portion 166 associated with the midsection 122 of main body 115, upwardly and outwardly extending gooseneck portions 168,170 (FIG. 49) associated with the first and second gooseneck sections 120,124 (FIG. 46) of the main body, and primarily outwardly extending head portions 172,174 (FIG. 49) associated with the first and second end sections 118,125 (FIG. 46) of axle 110. Bottom plate 114 generally matches the contour of channel 112. Bottom plate 114 is preferably slightly wider than channel 112 to provide a convenient welding surface. Large bend radii on bottom plate 114 eliminate stress concentrations and improve the durability of the welds joining channel 112 to the bottom plate. Torsion resistors similar to those described and illustrated herein, are positioned in registration with axle seat bolt holes 131.

Figure 57:
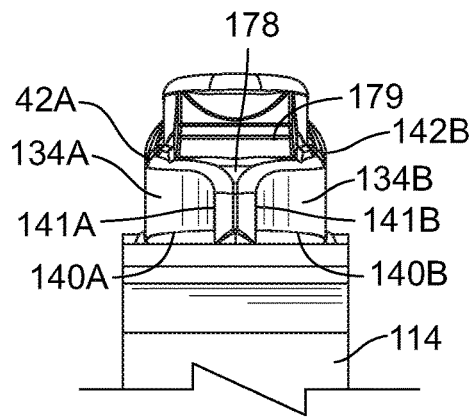
Figure 58:
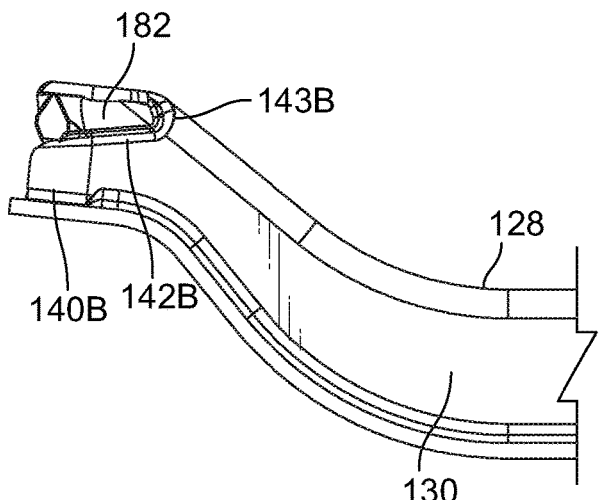
Figure 59:
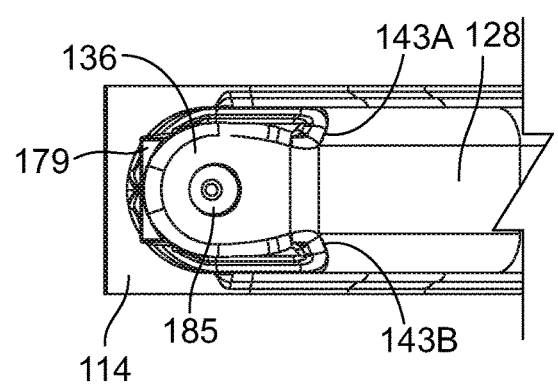
Figure 60:
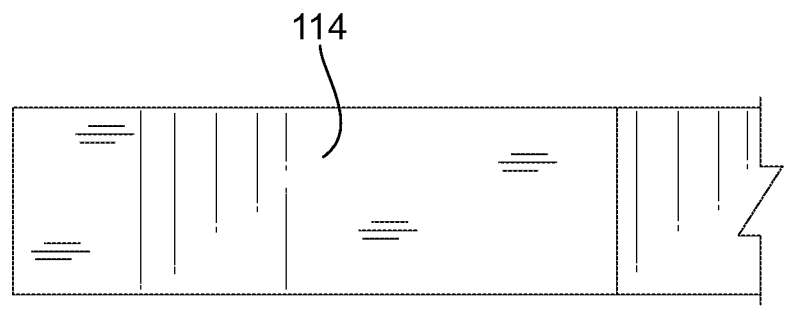
FIG. 60 is a slight perspective view of a bottom plate prior to a king pin bore being drilled through the bottom plate and head plate according to a second embodiment of the present disclosure.

Front and rear wall end extensions 134A,134B wrap at least partially, and in the particular embodiment of FIGS. 56, 57, 79 and 82 substantially around, and separately join to, the sidewall on the outboard side of head plate 116 (FIGS. 56, 57, 79, 82). Distal ends of the front and rear wall end extensions 134A, 134B remain spaced apart (FIG. 57, 79, 82). In the particular embodiment illustrated in FIG. 79, they are spaced apart by a distance less than the diameter of the king pin bore. Front and rear wall end extensions may wrap around less than half of the circumference of their respective head plates (including any percentage of the outboard surface of the head plate) while still achieving desired results, and may be symmetrically arranged about their head plates (FIGS. 57, 59, 72, 74) but such is not required.

Figure 76:
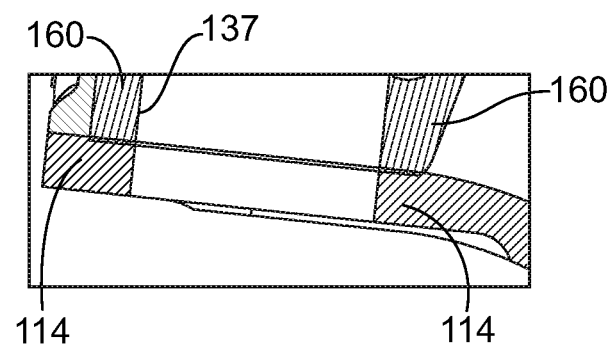
FIG. 76 is an enlargement of a select portion of the cross-sectional view of the vehicle axle of FIG. 75.
Figure 81:
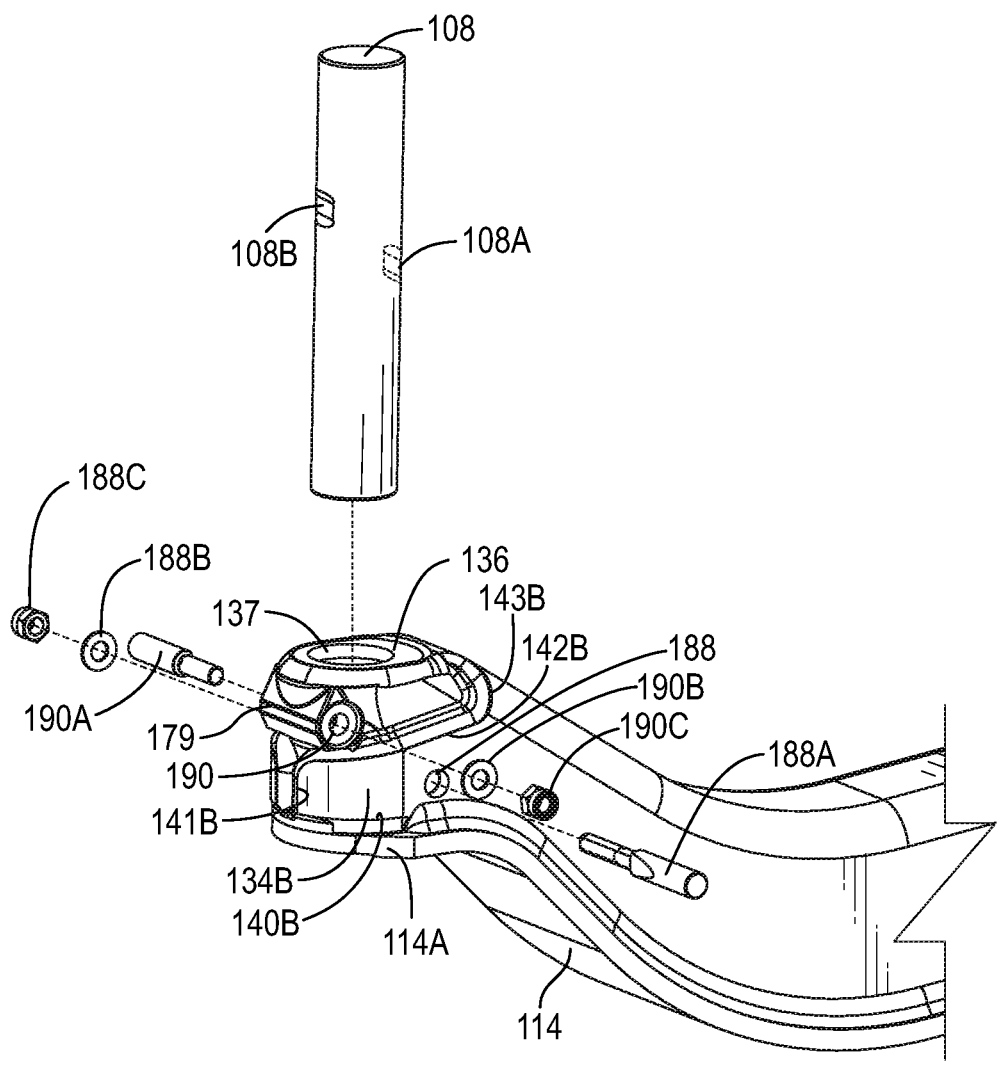
FIG. 81 is a partially exploded, rear, upper perspective view of the left side of the embodiment shown in FIGS. 44-46.
Figure 82:
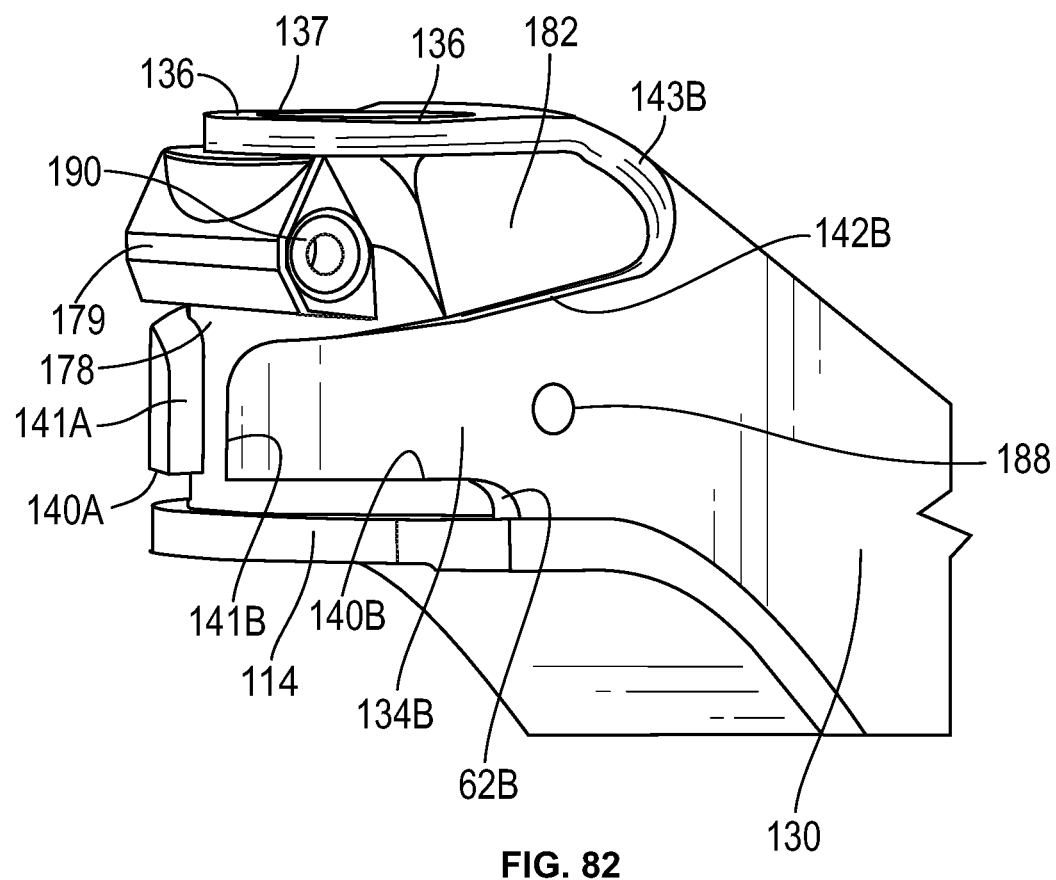
FIG. 82 is an enlargement of the embodiment shown in FIG. 71 without welding.

The edges of front and rear wall end extensions 134A, 134B and first cover flap (if provided) are shown in FIG. 82 without weld seams and include the lateral surfaces extending between the interior and the exterior surfaces of the front and rear wall end extensions 134A,134B. These surfaces may be generally perpendicular to, or alternatively, may form an obtuse or acute angle with portions of the front, rear and outboard surfaces, respectively 80,82,78 of sidewall 160 of first head plate 116. These edges extend around first cover flap 136, along hairpin turn 143A,143B, down the top (upper) edge 142A,142B, decreasing in elevation as it extends in the outboard direction in contact with the front, rear and outboard surfaces respectively 80,82,78 of sidewall 160 of first head plate 116. The edges of end extensions 134A,134B then transition into a generally vertical edge 141A,142B perpendicular to the top surface of bottom plate 114 at the distal end of end extensions 134A,134B. The edges of end extensions 134A,134B continue back in the inboard direction along their bottom edges. In this second embodiment, the bottom edges 140A,140B of end extensions 134A, 34B are spaced apart from the top surface of bottom plate 114 from 162A to 162B on the outboard side of head plate 116 that facilitates a contiguous, high penetration weld of end extensions 134A,134B, first head plate 116 and bottom plate 114 together. A vertical cross section of this weld, positioned above bottom plate 114 on the exterior of sidewall 160 of head plate 116, is shown in FIG. 76. Welding between top surface of the bottom plate 114 and the sidewall 160 of head plate 116, and between the sidewall 160 of head plate 116 and the bottom, vertical, top (upper), and hairpin turn edges (40A,40B, 41A,41B, 42A,42B, 43A,43B) and cover flap (136) edge of end extensions 134A,134B contribute to the even distribution of stresses throughout the axle, and in particular the head (end) sections, as well as to the head plate and corresponding end section acting as a unit under load (FIGS. 71-74, 80-83).

Figure 61:
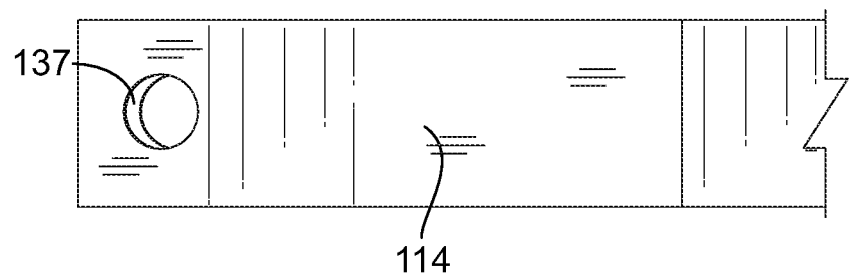
FIG. 61 is a slight perspective view of the bottom plate and head plate after a king pin bore is drilled through the head plate according to a second embodiment of the present disclosure.
Figure 62:
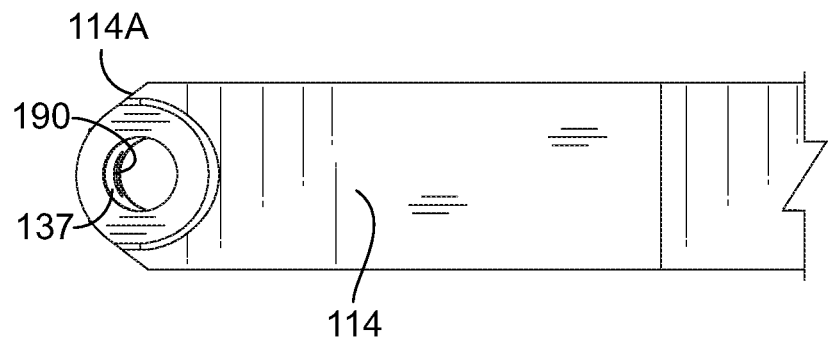
FIG. 62 is a slight perspective view of the bottom plate and head plate shown in FIG. 61 after further processing.

According to one method of manufacturing axle 110, a flat is subject to forming steps illustrated in FIGS. 47A-47D. With the flat processed into an open-bottom, U-shaped channel, a head plate 116 is inserted into each end section 118, 125 of channel 112 via the open bottom and joined with the end section of the U-shaped channel 112 by a tack weld at the location of the hair pin turns at the end sections 118, 125 of U-shaped channel 112 or by other suitable fastening means. Bottom plate 114 may then be secured to channel 112 to overlay the open bottom of channel 112 (FIGS. 56-60). Thereafter, generally vertical king pin bores may be cut or otherwise formed in cover flap 136, head plate 116 and bottom plate 114 (FIG. 61). Alternatively, each of cover flap 136, head plate 116, and bottom plate 114 may be provided with a pre-formed king pin bore prior to their being joined, but it may be advantageous to form a king pin bore after joinder to ensure proper alignment. Regardless of when formed, king pin bores may be substantially cylindrical (FIG. 75), complex cylindrical, frustoconical or a combination of any of the foregoing. The portion of the bottom plate 114 surrounding the king pin bore 137 may then undergo spotfacing or other appropriate machining to smooth the surface to ensure proper fit and rotation of the steering knuckle (not shown) around the king pin (FIG. 62). The outboard edge on the rear side of king pin bore 137 (FIG. 62) is machined to provide an edge surface 114a for intermittent, direct engagement with a projection of the steering axle to resist rotation of the steering axle beyond a predetermined position.

FIGS. 50-56 illustrate a head plate 116, according to a second embodiment of the present disclosure, prior to drilling or forming any king pin bore or king pin fastener bore. In contrast, FIGS. 64-70 illustrate an example of the fully formed and processed head plate 116 of FIGS. 50-56 taken from a fully assembled axle.

Example head plate 116 is a substantially solid piece of material and may be constructed from various materials, including steel, iron, aluminum, alloys (e.g., SAE 8620 steel alloy) or other suitable, substantially rigid materials (see FIGS. 13-18 for head plate prior to formation of king pin and related fastener bores, and FIGS. 27-34 for finished head plate). It will also be appreciated that a head plate 116 in accordance with the present disclosure may be manufactured by any suitable method, such as by forging, casting, machining or the like. Head plate 116 is generally positioned at the end section 118, 125 of the axle and/or occupies a cavity or void defined by front and rear wall end extensions 134A, 1346 and cover flap 136 (if provided). Head plate may include machined or formed surfaces configured to seat generally flush against the inner surfaces of channel 112. This may be advantageous to ensure proper orientation and more secure affixation of the head plate 112 within end section 118, 125 of axle 110.

As illustrated in FIGS. 65-70, example head plate 116 defines a top surface 184, a bottom surface 186, and a sidewall 160. Sidewall 160 extends between top surface 184 and bottom surface 186 and defines an inboard surface 176, an outboard surface 178, a front surface 180 and a rear surface 182. Head plate 116 also defines a plurality of bores which include a generally vertically oriented king pin bore 137 and one or more draw key bores 188, 190.

Figure 63:
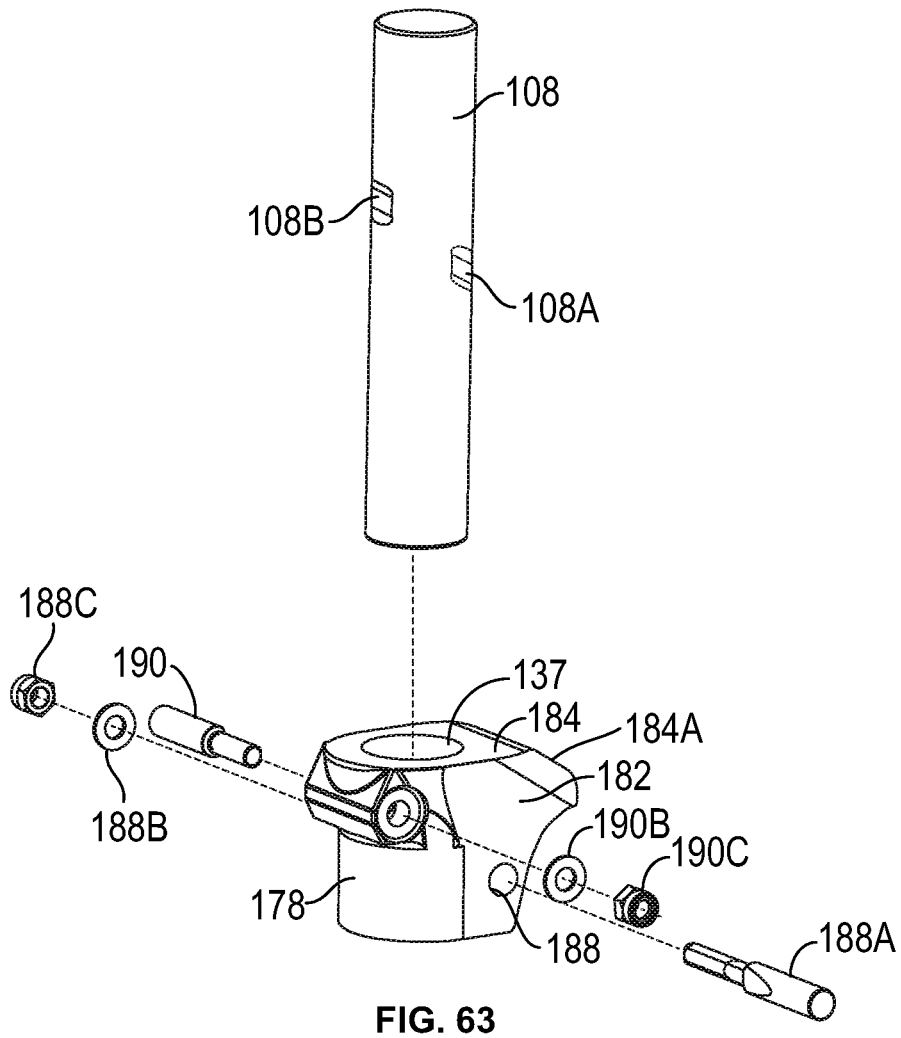
FIG. 63 is an exploded front perspective view of a king pin, head plate and draw keys according to a second embodiment of the present disclosure.
Figure 64:
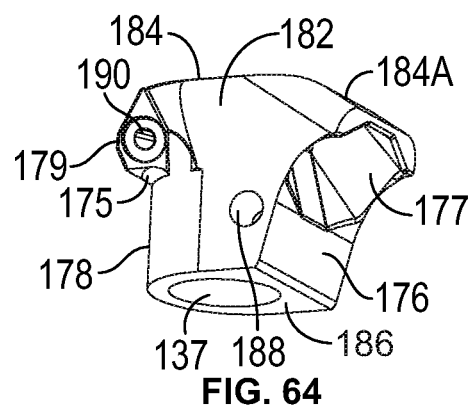
FIG. 64 is a perspective view of a finished head plate for a vehicle axle according to a second embodiment of the present disclosure.
Figure 65:
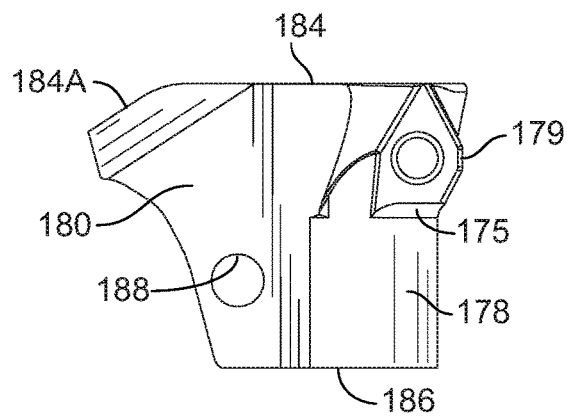
FIGS. 65-70 are respectively front, rear, outboard, inboard, top plan and bottom plan views of the head plate of FIG. 64.
Figure 66:
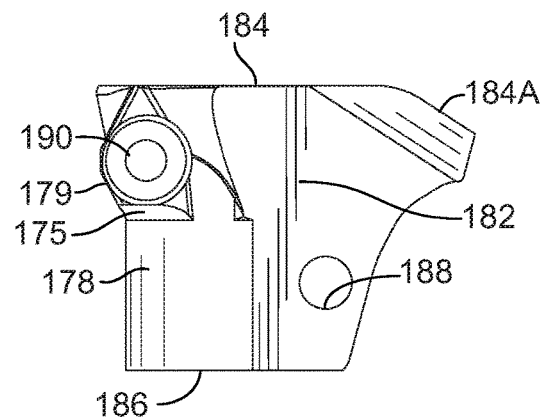
Figure 69:
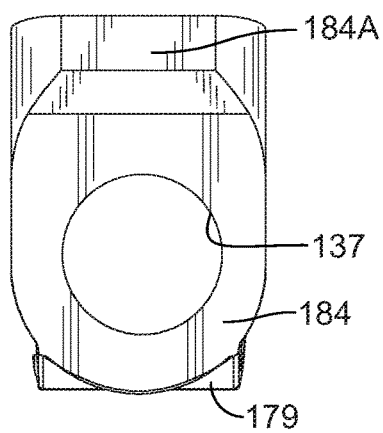
Figure 70:
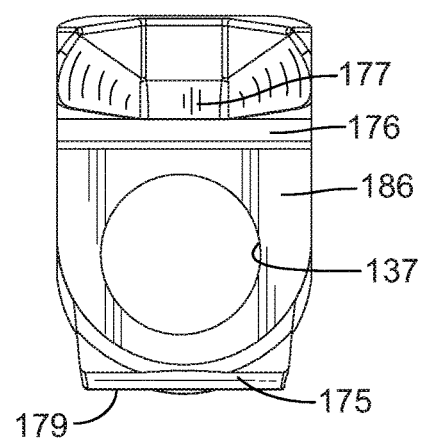
Figure 71:
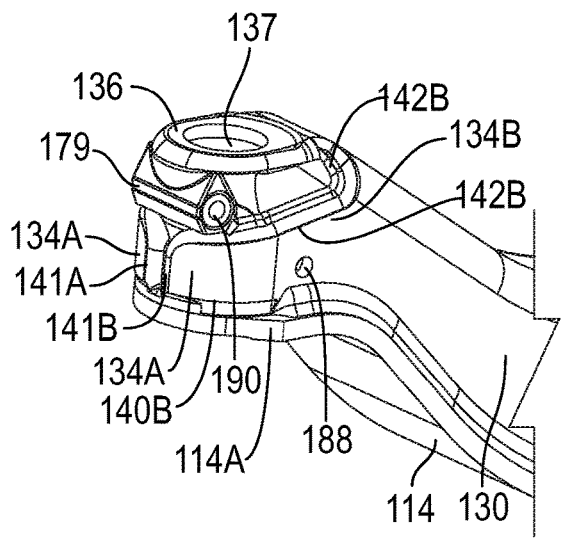
FIGS. 71-74 are perspective, end, rear elevational, and top plan views of the left side of the vehicle axle shown in FIGS. 56-59 having undergone further processing.

The top surface 184 of head plate 116 is generally flat and may have a bevel or awning formation 184A on the inboard side as illustrated in FIGS. 63-69. The lateral edges of bevel 184A may also be rounded (FIGS. 64, 69). The bottom surface 186 of the illustrated head plate 116 is generally flat (FIGS. 64,69).

The inboard surface 176 of the sidewall 160 of head plate 116 may include an indentation or pocket 177 in the upper portion (FIGS. 64,68), which assists in reducing the stiffness gradient at the channel-head plate interface, thereby increasing axle and related component fatigue life. (FIG. 64, 68, 75). A suitable indentation or pocket may also be created or enhanced on the inboard surface 176 of the sidewall 160 by extending the front and rear surfaces 180, 182 of sidewall 160 and the top surface 184 of head plate 116 in the inboard direction.

Figure 72:
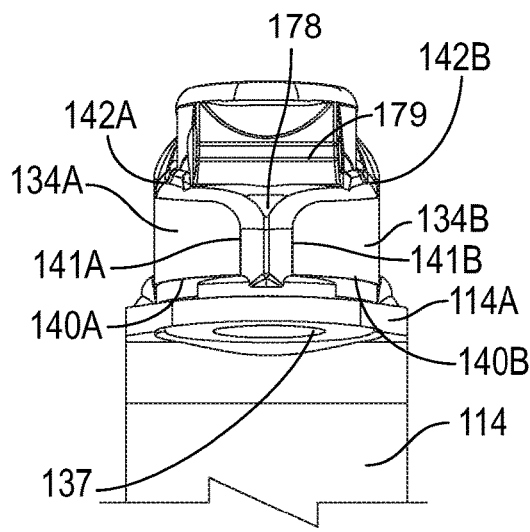
Figure 73:
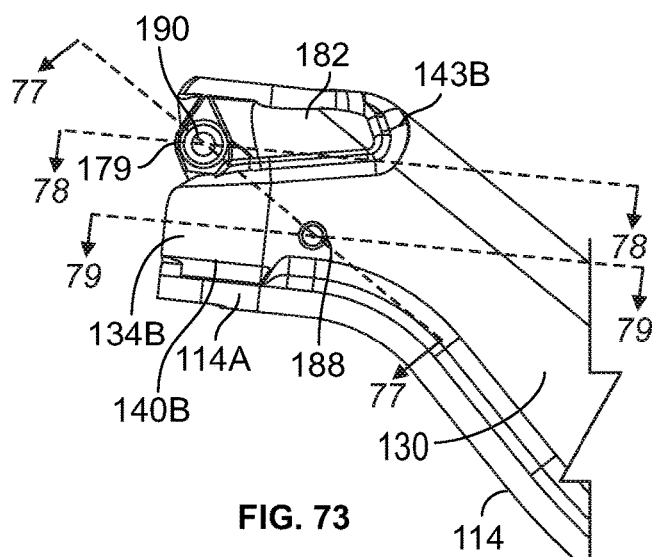
Figure 74:
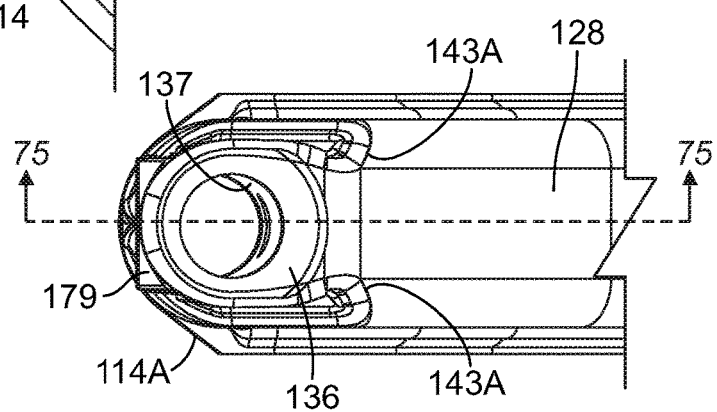
Figure 75:
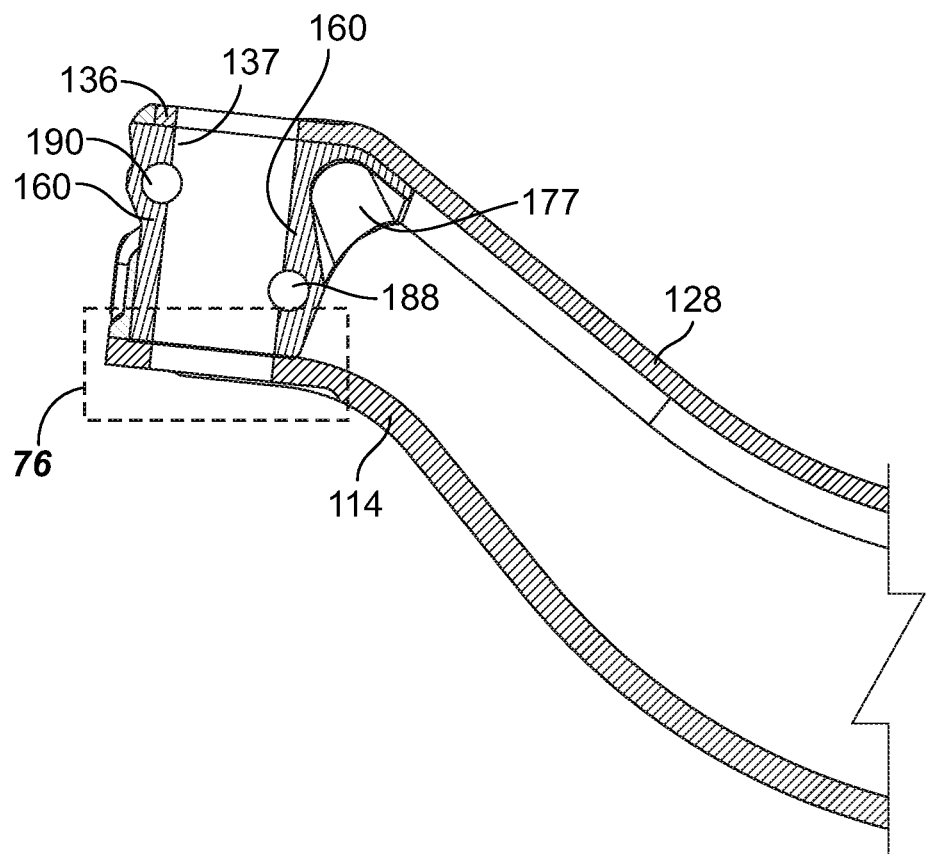
FIG. 75 is a cross-sectional view of the embodiment shown in FIG. 74, taken along lines 75-75 thereof.
Figure 77:
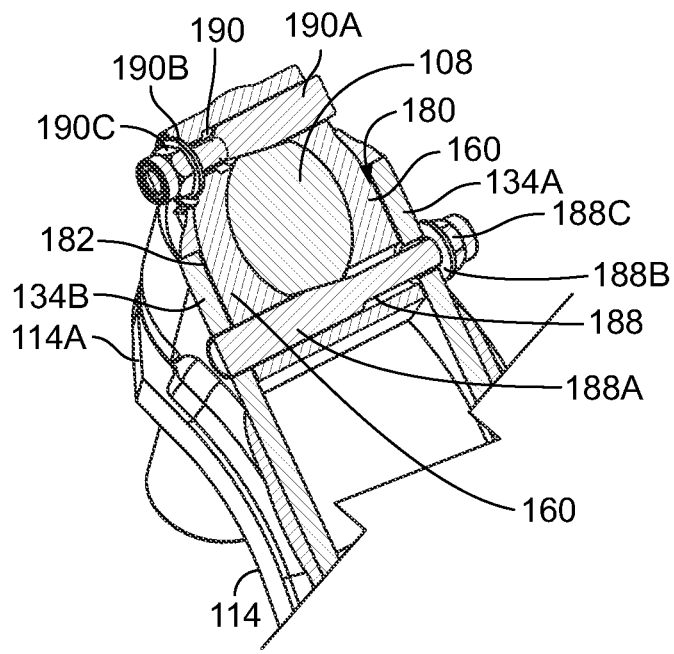
FIG. 77 is a partial cross-sectional view of the vehicle axle shown in FIG. 73 with a king pin inserted and taken along lines 77-77 thereof.

The outboard surface 178 of the sidewall 160 of the illustrated head plate 116 may project a portion of a generally horizontally oriented and generally cylindrical or other suitable elongated formation 179 incorporating a king pin fastener or draw key bore 190 if head plate 116 employs a draw key 190A on the outboard side of the king pin (FIGS. 63, 81). In example head plate 116, the elongated formation 179 incorporating an outboard draw key bore is in the upper portion of head plate 116 and is vertically offset from inboard draw key bore 188 (FIGS. 75, 77). This configuration also provides clearance for front and rear wall end extensions 134A, 134B to be secured to the head plate in a number of locations, such as for example, as illustrated in FIGS. 35, 36 where the distal ends of front and rear wall end extensions 134A, 1346 are welded on the outboard surface 178 of sidewall 160 in close proximity to elongated formation 179. The clearance provided by the location of elongated formation 179 and by associated groove 175 on the underside of formation 179 (FIGS. 62, 67, 87) provides additional space for welding operations and allow weld to accumulate along the upper edge of front and rear wall end extensions 134A, 134B (FIGS. 72-72).

Figure 67:
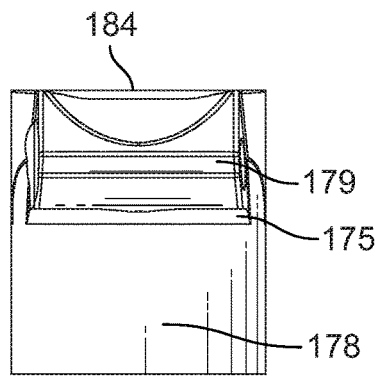
Figure 68:
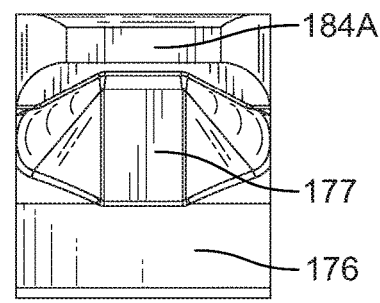

The front surface 180 (FIG. 66) and rear surface 182 (FIG. 67) of the sidewall 160 of the illustrated head plate 116 are generally flat and generally parallel to one another as these surfaces extend outboard from the inboard edge of head plate 116 to a location approximately even with the central longitudinal axis of the king pin bore 137. Continuing beyond this location in the outboard direction, the lower portion of the outside surface 178 of sidewall 160 is generally semi-cylindrical in shape (FIGS. 64-66) as sidewall 160 extends from the rear or back surface 182 (FIG. 66) to the front surface 180 (FIG. 65) on the outboard side of head plate 116 (FIGS. 63,67).

Figure 78:
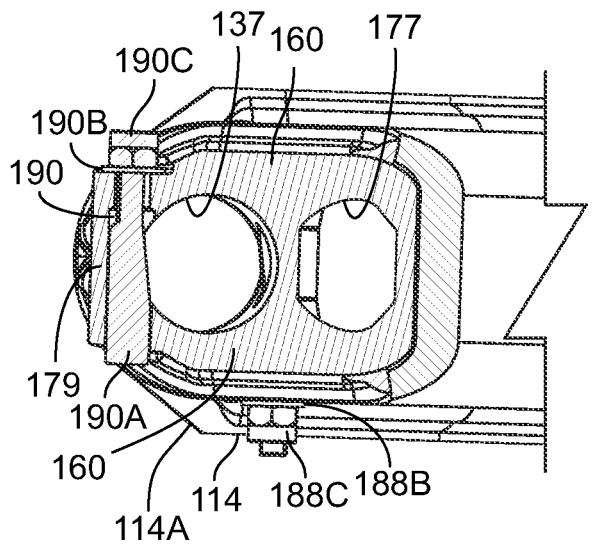
FIG. 78 is a partial cross-sectional view of the vehicle axle shown in FIG. 73, taken along lines 78-78 thereof.
Figure 79:
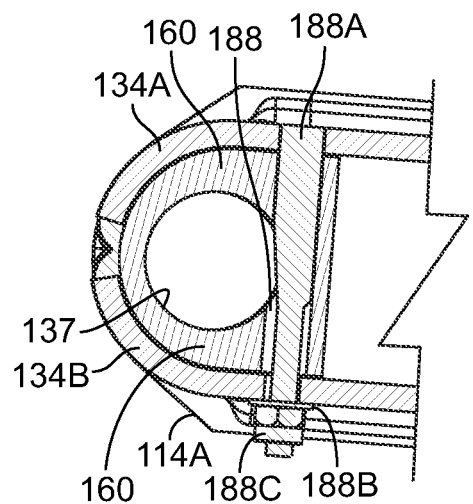
FIG. 79 is a partial cross-sectional view of the vehicle axle shown in FIG. 73, taken along lines 79-79 thereof.
Figure 80:
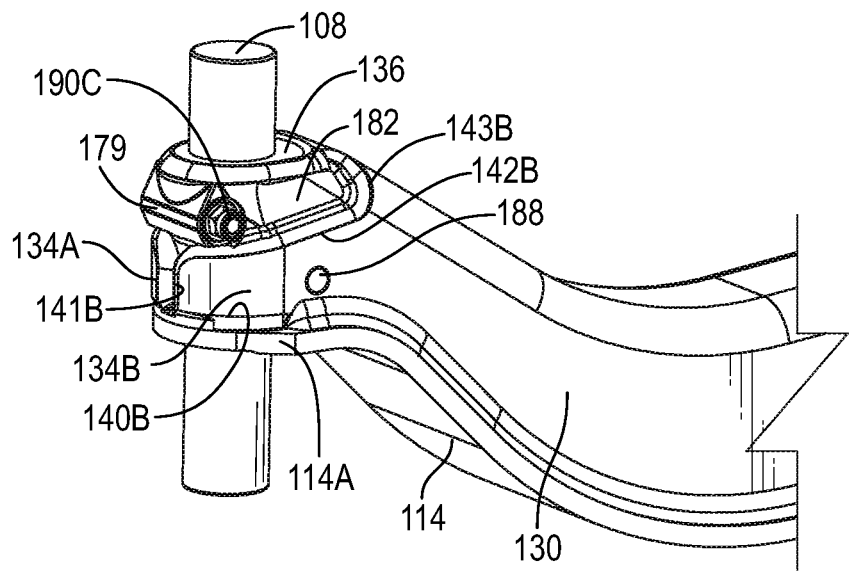
FIG. 80 is a rear, upper perspective view of the left side of the embodiment shown in FIGS. 44-46.

Head plate 116 also defines a generally vertically oriented king pin bore 137 and one or more king pin fastener or draw key bores 189, 190 which allow for a removable king pin. The generally vertically oriented king pin bore extends between bottom surface 186 and top surface 184. First and second king pin fastener or draw key bores 188,190 partially intersect the king pin bore and extend through head plate 116 (FIGS. 77-79). In example head plate 116, they also are positioned in opposite directions and on opposing sides of the king pin bore 137 (i.e., outboard and inboard sides) and are generally horizontally disposed and generally parallel to one another. (FIGS. 63, 81, 77-79). Corresponding first and second king pin fasteners or draw keys each include an elongated head 189A, 191A having a tapered flat 189B, 191B which transitions into a threaded shaft 189C, 191C. (FIGS. 77-79). The tapered flat 189B, 191B of each draw key engages a corresponding flat 108A, 108B (FIG. 63,81) or other suitable irregularity on the king pin to prevent rotational and vertical movement of the king pin in relation to head plate 116. The threaded shaft portion 189C, 191C of the draw key engages a washer and a nut or other suitable connector or connector and washer combination (189B, 188C, 190B, 190C), which when tightened, removably secures the king pin and the draw key in place.

As described and illustrated herein, a king pin fastener bore may be defined by the head plate without front or rear wall end extensions 134A, 134B (FIGS. 77,78), or alternatively, by the head plate and by front wall end extension 134A, rear wall end extension 134B, or both (FIGS. 77, 79).

A head plate in accordance with the present disclosure may be outfitted with a two draw key configuration wherein first and second draw keys are positioned on opposite sides (FIG. 77) or on the same side of the king pin bore 137. A draw key bore may also be configured to have substantially the same diameter at each end, allowing the corresponding draw key to be oriented in either direction during vehicle operation. A draw key bore, however, may be configured to require the draw key to be oriented in only one direction, such as for example, by reducing the diameter of the draw key bore occupied by the threaded shaft portion of the draw key. (FIGS. 77-79). A reduction or other change in diameter of a draw key bore can be introduced by head plate 116, such as in the sidewall 160 of head plate 116 (FIG. 78), or by a vertically oriented channel wall, including a front or rear wall end extension 134A, 134B (FIG. 43), or both.

While the illustrated draw key configuration for head plate 116 utilizes two draw keys in the manner described and illustrated herein, a head plate utilizing more than one draw key may orient each draw key in the same direction and/or provide more than one draw key on the same or on different sides of a king pin bore, space permitting, without departing from the scope of the present disclosure. Alternatively, a head plate in accordance with the present disclosure may utilize a single draw key configuration wherein the corresponding draw key bore may be positioned in any one of a number of locations, including on the inboard or the outboard side the king pin bore.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope of this disclosure is not limited to the above description but is as set forth in the following claims, and it is understood that claims may be directed to the features hereof, including as combinations of features that are individually disclosed or claimed herein.

We claim:

1. An axle for a vehicle, the axle comprising:
    a main beam formed by a channel and a bottom plate secured to the channel, the channel having an inverted U-shaped configuration defining a front wall, a rear wall and a top wall;
    the main beam forming at one end, a first axle head section and at an opposing end, a second axle head section, the main beam and the channel extending between the first axle head section and the second axle head section;
    a first head plate comprising a top surface, a bottom surface and a sidewall extending therebetween, the sidewall having inboard, outboard, front and rear surfaces, the first head plate secured to the channel at the first axle head section;
    the first head plate, further comprising, a first king pin bore extending in a generally vertical direction between the bottom surface and the top surface of the first head plate, and a portion of a first fastener bore extending in a generally horizontal direction and partially intersecting the first king pin bore and configured to receive a first fastener to assist in removably securing a king pin within the first king pin bore;
    wherein a portion of the bottom plate surrounds the king pin bore and the first fastener bore is partially defined by a portion of the front wall and/or a portion of the rear wall, said portion of the front wall includes a first extension extending from the front wall of the channel and is positioned at the first axle head section and the portion of the rear wall includes a second extension extending from the rear wall of the channel and is positioned at the first axle head section;
    and wherein the first extension and the second extensions wrap partially around and are separately joined to the first head plate.

2. The vehicle axle of claim 1 wherein the first fastener bore has a non-uniform diameter.

3. The vehicle axle of claim 1 wherein the first fastener bore has a first diameter and a second diameter.

4. The vehicle axle of claim 1, the first head plate further comprising at least a portion of a second fastener bore, the second fastener bore at least partially defined by the first head plate and extending in a generally horizontal direction and partially intersecting the first king pin bore and configured to receive a second fastener to assist in removably securing the king pin within the first king pin bore.

5. The vehicle axle of claim 4, wherein the length of the first fastener bore is not substantially the same as the length as the second fastener bore.

6. The vehicle axle of claim 4 wherein the first and second fastener bores are positioned on different sides of the first king pin bore.

7. The vehicle axle of claim 4 wherein the first and second fastener bores are vertically offset from one another and positioned on opposite sides of the top or upper edge of at least one of the first extension and the second extension.

8. The vehicle axle of claim 4 wherein at least one of the first and second fastener bores extend through at least one of the first extension and the second extension.

9. The vehicle axle of claim 1 having a cover flap extending from the end of the top wall of the channel and positioned at the first axle head section the first head plate occupying a cavity defined by the first and second extensions and the cover flap.

10. The vehicle axle of claim 1 wherein the first and second extensions have respective distal ends that are spaced apart.

11. The vehicle axle of claim 1 wherein the first and second extensions have upper edges which decrease in elevation as they extend in the outboard direction, and in contact with the front rear and outboard surfaces of the sidewall of the first head plate.

12. The vehicle axle of claim 1 wherein the first and second extensions are narrowed by grooves or cut-outs providing gaps between the bottom edges of the first and second extensions and the bottom plate.

13. The vehicle axle of 1 wherein the front and rear surfaces of the sidewall of the first head plate are generally flat and the outboard surface of the first head plate is generally semi-cylindrical in shape.

14. The vehicle axle of 4 wherein the second fastener bore is defined by the first head plate and not by the first extension or the second extension.

15. The vehicle axle of claim 1 wherein the top surface of the first head plate has a bevel or awning formation on the inboard side.

16. The vehicle axle of claim 1 wherein the inboard side of the first head plate defines an indentation or pocket to reduce the stiffness gradient at the channel-head plate interface.

17. The vehicle axle of claim 1 wherein the bottom plate has an edge surface machined to serve as a steering stop.

18. The vehicle axle of claim 1 wherein the portion of the bottom plate that surrounds the king pin bore defines an opening and the king pin bore extends through said opening.

19. The vehicle axle of claim 18 wherein the bottom surface of the head plate sits flush with the top surface of the bottom plate.

20. The vehicle axle of claim 18 wherein the bottom surface of the head plate is received by the opening in the bottom plate.

21. The vehicle axle of claim 14, wherein the outboard surface of the sidewall projects a generally horizontally oriented and generally cylindrical formation across the outboard surface of the sidewall, said formation incorporating the second fastener bore.

\* \* \* \* \*